US012519122B2

(12) United States Patent
Ragi et al.

(10) Patent No.: US 12,519,122 B2
(45) Date of Patent: Jan. 6, 2026

(54) MODULAR FUEL CELL POWER SYSTEM ARCHITECTURE FOR HYBRID VEHICLES

(71) Applicants: CUMMINS INC., Columbus, IN (US); HYDROGENICS CORPORATION, Mississauga (CA)

(72) Inventors: Sravan Kumar Ragi, Columbus, IN (US); Agneya Turlapati, Indianapolis, IN (US); David Genter, Columbus, IN (US); Brian K. Landes, Seymour, IN (US); Heonjoong Lee, Columbus, IN (US); Kieran J. Richards, West Haddon (GB); Rohit Saha, Columbus, IN (US); Richard J. Ancimer, Toronto (CA); Nathaniel Ian Joos, Toronto (CA)

(73) Assignees: CUMMINS INC., Columbus, IN (US); HYDROGENICS CORPORATION, Mississauga (CA)

( * ) Notice: Subject to any disclaimer, the term of this patent is extended or adjusted under 35 U.S.C. 154(b) by 359 days.

(21) Appl. No.: 18/317,306

(22) Filed: May 15, 2023

(65) Prior Publication Data
US 2023/0369629 A1 Nov. 16, 2023

Related U.S. Application Data

(60) Provisional application No. 63/342,498, filed on May 16, 2022.

(51) Int. Cl.
*H01M 8/2465* (2016.01)
*B60K 15/063* (2006.01)
(Continued)

(52) U.S. Cl.
CPC ......... *H01M 8/2465* (2013.01); *B60K 15/063* (2013.01); *B60L 50/75* (2019.02);
(Continued)

(58) Field of Classification Search
CPC .......... H01M 8/2465; H01M 8/04201; H01M 8/2457; H01M 2008/1095;
(Continued)

(56) References Cited

U.S. PATENT DOCUMENTS 7,441,615 B2 * 10/2008 Borroni-Bird ......... B62D 21/10
180/402
9,627,707 B1 * 4/2017 Ko ...................... H01M 8/2475
(Continued)

FOREIGN PATENT DOCUMENTS

CN 103384610 B * 4/2016 ............... B60K 1/04
CN 206336144 U * 7/2017
(Continued)

OTHER PUBLICATIONS

DE-102020122081-A1 English Translation (Year: 2022).*
(Continued)

*Primary Examiner* — Michael T. Walsh
(74) *Attorney, Agent, or Firm* — Barnes & Thornburg LLP

(57) ABSTRACT

A modular power system includes a fuel cell module and a battery module. The fuel cell module has a plurality of fuel cell stacks. Each fuel cell stack includes a plurality of fuel cells. The plurality of fuel cells is arranged in a vertical orientation in one or more planes located above and perpendicular to a chassis of the vehicle. The battery module has a plurality of batteries arranged in one or more battery stacks. The battery module is electrically connected to the fuel cell module. The plurality of batteries is located in one or more planes directly above and parallel to the chassis.

15 Claims, 14 Drawing Sheets

(51) Int. Cl.
*B60L 50/75* (2019.01)
*H01M 8/04082* (2016.01)
*H01M 8/2457* (2016.01)
*B60K 15/03* (2006.01)
*H01M 8/10* (2016.01)
*H01M 8/12* (2016.01)

(52) U.S. Cl.
CPC ..... *H01M 8/04201* (2013.01); *H01M 8/2457* (2016.02); *B60K 2015/03315* (2013.01); *B60L 2200/40* (2013.01); *H01M 2008/1095* (2013.01); *H01M 2008/1293* (2013.01); *H01M 2250/20* (2013.01)

(58) Field of Classification Search
CPC ..... H01M 2008/1293; H01M 2250/20; H01M 8/249; B60K 15/063; B60K 2015/03315; B60K 1/04; B60L 50/75; B60L 2200/40; B60L 2200/36; B60L 15/007; B60L 50/72; B60L 50/66; B60L 58/40; B60L 50/71; B60L 3/0053; Y02E 60/50; Y02T 90/40

See application file for complete search history.

(56) References Cited

U.S. PATENT DOCUMENTS

| 11,955,620 | B1 * | 4/2024 | Soles | H01M 10/625 |
| 2006/0102398 | A1 | 5/2006 | Mizuno | |
| 2021/0362589 | A1 * | 11/2021 | Morinaga | B60K 15/03006 |
| 2022/0348112 | A1 * | 11/2022 | Castonguay | H01M 10/625 |
| 2023/0369629 | A1 * | 11/2023 | Ragi | B60L 50/72 |

FOREIGN PATENT DOCUMENTS

| CN | 110217116 | | 9/2019 | | |
| CN | 212571063 | U * | 2/2021 | | |
| CN | 113787920 | B * | 11/2023 | ............. | B60L 50/71 |
| DE | 102020205906 | A1 * | 4/2021 | ............... | B60L 1/02 |
| DE | 102020122081 | A1 * | 2/2022 | ............ | H01M 8/04 |
| GB | 2587666 | A * | 4/2021 | ......... | H01M 16/006 |
| JP | 2001113962 | A * | 4/2001 | | |
| JP | 2001313061 | A * | 11/2001 | | |
| KR | 101103628 | B1 * | 1/2012 | ............ | B62M 23/02 |
| KR | 101951439 | B1 * | 5/2019 | ....... | H01M 8/04686 |
| WO | 2021/064010 | | 4/2021 | | |

OTHER PUBLICATIONS

CN-206336144-U (English Translation) (Year: 2017).*
CN-103384610-B (English Translation) (Year: 2016).*
JP-2001313061-A (English Translation) (Year: 2001).*
KR-101951439-B1 (English Translation) (Year: 2019).*
CN-113787920-B (English Translation) (Year: 2023).*
DE-102020205906-A1 (English Translation) (Year: 2021).*
CN-212571063-U (English Translation) (Year: 2021).*
JP-2001113962-A (English Translation) (Year: 2001).*
KR-101103628-B1 (English Translation) (Year: 2012).*
GB-2587666-A (English Translation) (Year: 2021).*

* cited by examiner

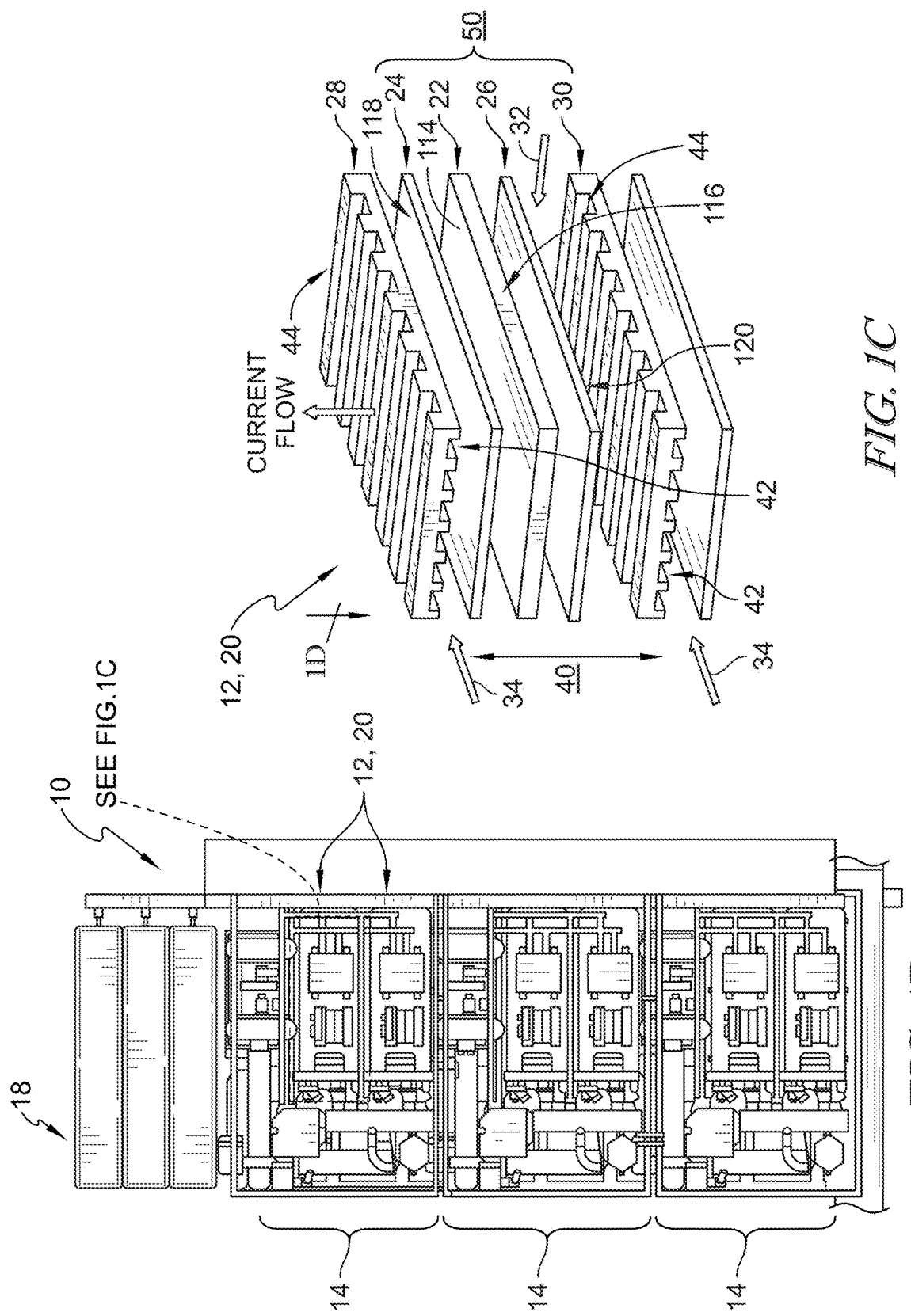

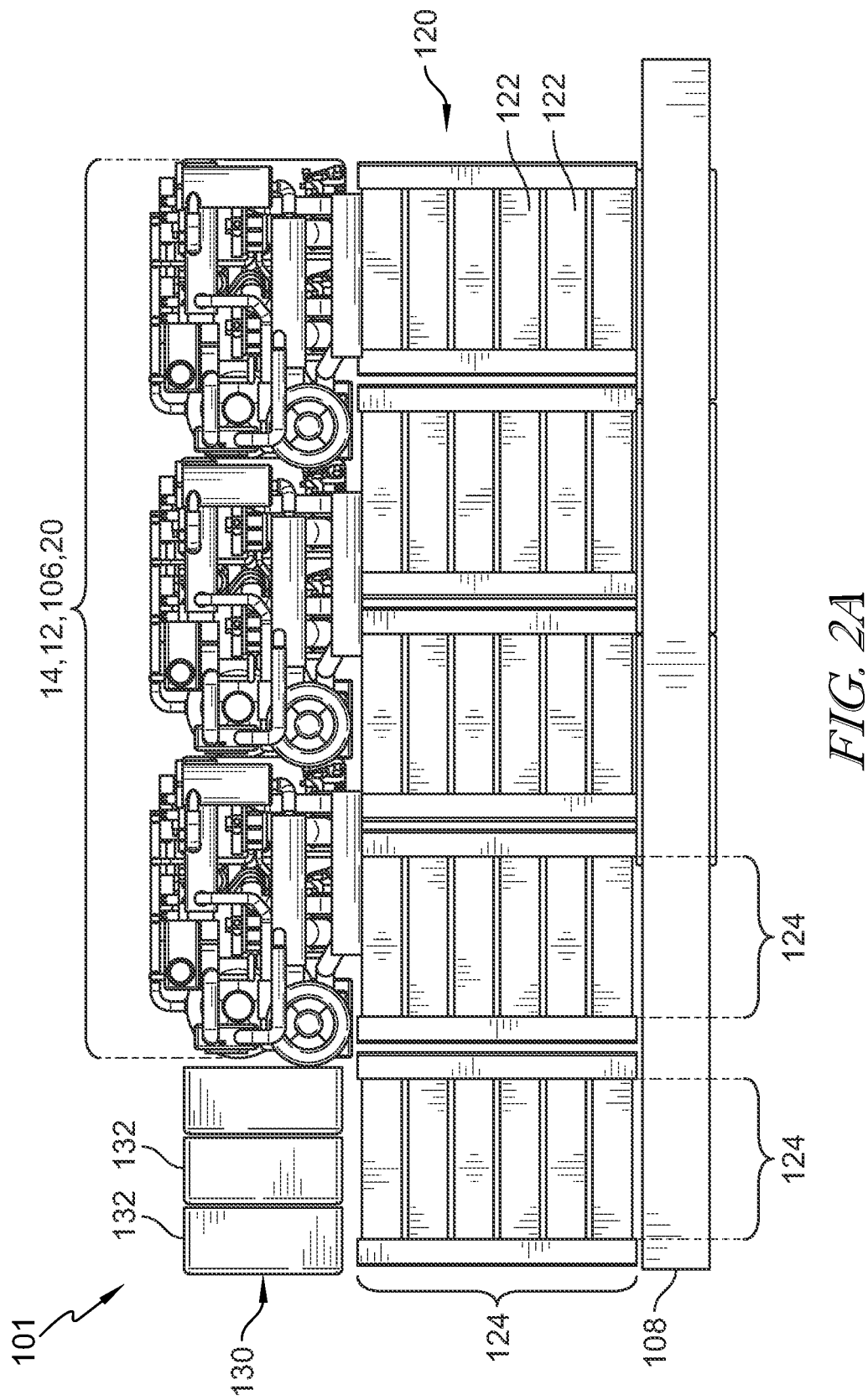

MODULAR FUEL CELL POWER SYSTEM ARCHITECTURE FOR HYBRID VEHICLES

CROSS-REFERENCE TO RELATED APPLICATIONS

This nonprovisional application claims the benefit and priority, under 35 U.S.C. § 119(e) and any other applicable laws or statutes, to U.S. Provisional Patent Application Ser. No. 63/342,498 filed on May 16, 2022, the entire disclosure of which is hereby expressly incorporated herein by reference.

TECHNICAL FIELD

The present disclosure generally relates to modular fuel cell systems that provide power, air handling, and/or cooling systems to create a hybrid or electric vehicle.

BACKGROUND

A fuel cell vehicle may use a fuel cell, in combination with a battery or a super-capacitor, to power its electric motor. Fuel cells have been used in various kinds of vehicles (e.g., trucks), especially in applications where their clean emissions are important to air quality. Most fuel cell vehicles are classified as zero-emission vehicles as they only emit water and heat as by-products.

Fuel cell vehicles have the potential to significantly reduce the automobile industry's dependence on oil and to lower harmful emissions that contribute to climate change. Fuel cell vehicles generate electricity via an electrochemical reaction between reactants (e.g., hydrogen and oxygen). Therefore, fuel cell vehicles emit no or limited harmful emissions in comparison to vehicles powered by gasoline (e.g., vehicles comprising an internal combustion engines). Accordingly, such fuel cell vehicles are being used.

Fuel cell systems usually include fuel cell stacks comprising a plurality of individual fuel cells. Fuel cell stacks may house individual fuel cells connected together in series and/or in parallel. Additionally, one or more battery systems may be electrically connected to the fuel cells stacks. Fuel cell systems also require a fuel supply (e.g., hydrogen supply), and/or an air supply. Optionally, a voltage converter to convert the voltage of the fuel cell stacks to higher power in order to operate the vehicle may be included with a fuel cell system, along with a radiator system to cool the fuel cell stacks and voltage converter.

Further, the fuel cell system may further include an air handling or a coolant piping system. For example, the air handling system is often implemented to connect air (e.g., compressed air) to the fuel cell stack in order to provide oxygen to the fuel cells. The coolant system (e.g., a radiator system) is generally implemented to enable heating and/or cooling of various parts of the fuel cell system including the fuel cell stack.

Implementing, integrating, and/or adapting all these different fuel cell system components onto or into an existing diesel vehicle is a challenge in the automotive industry. This challenge and the associated complexity only increase as the size of the vehicle and its respective components increase (e.g. mining trucks). The larger the vehicle, the more fuel cell stacks and/or battery systems are needed to properly power and operate the vehicle.

The present disclosure is related to modular fuel cell systems to power vehicles. In particular, the present disclosure is directed to a modular power system for providing power, air, and coolant handling to the vehicle (e.g., a hybrid or an electric vehicle). Specifically, the present disclosure is related to a modular radiator for cooling the modular power system. In addition, the present disclosure is directed to modular fuel supply systems to provide hydrogen to the vehicle. Accordingly, the modular systems of the present disclosure provide easy and efficient conversion and integration of existing diesel vehicles, specifically, mining trucks, into fuel cell vehicles.

SUMMARY

The present disclosure is directed to a modular power system and more specifically, modular fuel cell system to provide power to a vehicle.

In one aspect, the present disclosure is directed to a modular power system providing power to a vehicle, comprising a fuel cell module having a plurality of fuel cell stacks, each fuel cell stack comprising a plurality of fuel cells, wherein the plurality of fuel cells are arranged in a vertical orientation in one or more planes located above and perpendicular to a chassis of the vehicle, and a battery module having a plurality of batteries arranged in one or more battery stacks. In some embodiments, the battery module may be electrically connected to the fuel cell module, and the plurality of batteries may be located in one or more planes directly above and parallel to the chassis and fuel cell module. In some embodiments, the vehicle is a truck. In some embodiments, the truck is a mining truck.

In some embodiments, the system further comprises a voltage converter module located in a same plane as the fuel cell module above the chassis and the battery module. In some embodiments, the voltage converter module may comprise one or more voltage converters. In some embodiments, the voltage converter module may be located adjacent to the fuel cell module. In some embodiments, the one or more voltage converters may be DC/DC converters.

In some embodiments, the vertical orientation of the fuel cell stacks may comprise a 90 degree rotation of the fuel cell stacks from a standard orientation. In some embodiments, the standard orientation may have the plurality of fuel cells arranged in one or more planes parallel to the chassis.

In some embodiments, the battery module may be located in front of the vehicle, specifically, in a position forward of a plurality of back wheels of the vehicle. In some embodiments, the one or more battery stacks may be arranged in one or more planes vertical to the chassis. In some embodiments, the plurality of fuel cell stacks may be arranged upon one or more planes parallel to the chassis and in a group of two providing a plurality of fuel cell stack pairs in the fuel cell module. In some embodiments, the fuel cell stacks in each fuel cell stack pair may be electrically connected in series. In some embodiments, the plurality of fuel cell stack pairs may be electrically connected in parallel. In some embodiments, each fuel cell stack pair of the plurality of fuel cell stack pairs may be capable of operating independently from other fuel cell stack pairs.

In one aspect, the present disclosure is directed to a modular fuel cell system providing power to a vehicle, comprising, a fuel cell module having a plurality of fuel cell stacks, each fuel cell stack comprising a plurality of fuel cells. In some embodiments, the fuel cells may be arranged in a vertical orientation in one or more planes located above and perpendicular to a chassis of the vehicle. In some embodiments, the vehicle may be a truck. In some embodiments, the truck may be a mining truck.

In some embodiments, the vertical orientation of the fuel cell stacks may comprise a 90 degree rotation of the fuel cell stacks from a standard orientation. In some embodiments, the standard orientation may have the plurality of fuel cells arranged in one or more planes parallel to the chassis. In some embodiments, the plurality of fuel cell stacks may be arranged upon one or more planes parallel to the chassis in a group of two providing a plurality of fuel cell pairs in the fuel cell module. In some embodiments, the fuel cell stacks in each fuel cell pair may be electrically connected in series. In some embodiments, the plurality of fuel cell pairs may be electrically connected in parallel. In some embodiments, each fuel cell pair of the plurality of fuel cell pairs may be capable of operating independently from other fuel cell pairs.

In some embodiments, the system may further comprise an air pumping system to deliver air to all of the fuel cells comprised in the plurality of the fuel cell stacks. In some embodiments, the air pumping system may comprise a first air filter located on a first side of the modular power system and a first pipe configured to deliver air to all of the fuel cells of the plurality of fuel cell stacks.

In some embodiments, a modular radiator system for cooling the modular power system described above may comprise a first radiator for cooling the fuel cell stacks of the fuel cell module, a second radiator for cooling the battery stacks of the battery module located adjacent to the first radiator, and a third radiator for cooling a power electronics system. In some embodiments, the third radiator may be located adjacent to the first radiator and adjacent to and on above the second radiator away from the chassis. In some embodiments, the modular radiator system may be located adjacent to the modular power system and in front of the vehicle, specifically in a position forward of a plurality of back wheels of the vehicle.

In some embodiments, the system may further comprise a piping system. In some embodiments, the piping system may comprise independent coolant pipes for each of the first radiator, the second radiator, and the third radiator. In some embodiments, the piping system may comprise a coolant for each of the first radiator, the second radiator, and the third radiator. In some embodiments, the coolant for one or more of the first radiator, the second radiator, and the third radiator may be a different coolant.

In some embodiments, the independent coolant pipe for the first radiator may prevent the coolant of the first radiator to mix with the coolants of the second and third radiators. In some embodiments, the independent coolant pipe for the second radiator may prevent the coolant of the second radiator to mix with the coolants of the first and third radiators. In some embodiments, the independent coolant pipe for the third radiator may prevent the coolant of the third radiator to mix with the coolants of the first and second radiators.

In some embodiments, the independent coolant pipe for the first radiator may comprise a first outlet pipe and a first inlet pipe. In some embodiments, the first outlet pipe may be located in a greater distance from the chassis than the first inlet pipe. In some embodiments, the independent coolant pipe for the second radiator may comprise a second outlet pipe and a second inlet pipe. In some embodiments. In some embodiments, the second outlet pipe is located in a greater distance from the chassis than the second inlet pipe. In some embodiments, the independent coolant pipe for the third radiator may comprise a third outlet pipe and a third inlet pipe. In some embodiments, the third outlet pipe may be located in a greater distance from the chassis than the third inlet pipe. In some embodiments, the first outlet pipe may be a single pipe delivering coolant to each fuel cell stack and the first inlet pipe may be a single pipe receiving coolant from each fuel cell stack. In some embodiments, the second outlet pipe may be a single pipe delivering coolant to each battery stack and the second inlet pipe may be a single pipe receiving coolant from each battery stack.

In one aspect, the present disclosure is directed to a modular fuel supply system providing hydrogen to a vehicle powered by fuel cell, comprising one or more hydrogen supply modules located on a right side or a left side of the vehicle, wherein a first hydrogen supply module is further located between a front wheel and a back wheel of the vehicle. In some embodiments, the first hydrogen supply module may comprise a plurality of hydrogen supply stacks, each hydrogen supply stack comprising a plurality of hydrogen tanks arranged in one or more planes located parallel to a chassis of the vehicle. In some embodiments, each hydrogen supply tank may be configured to operate independently from other hydrogen supply tanks.

In some embodiments, the system may comprise a second hydrogen supply module located between the front wheel and the back wheel of the vehicle and on the right side or the left side of the vehicle opposite to a side the first hydrogen supply module is located. In some embodiments, the second hydrogen supply module may comprise a second plurality of hydrogen supply stacks, each hydrogen supply stack comprising a second plurality of hydrogen tanks arranged in one or more planes located parallel to the chassis of the vehicle.

In some embodiments, each hydrogen supply tank may be configured to operate independently from other hydrogen supply tanks. In some embodiments, the vehicle may be a truck. In some embodiments, the truck may be a mining truck.

BRIEF DESCRIPTION OF THE DRAWINGS

FIG. 1B is a cutaway view of an exemplary fuel cell system including an air delivery system, hydrogen delivery systems, and a plurality of fuel cell modules each including multiple fuel cell stacks;

FIG. 1C is a perspective view of an exemplary repeating unit of a fuel cell stack of the fuel cell system of FIG. 1A;

FIG. 2A is a side view of an embodiment of a modular power system to provide power to a vehicle;

These and other features, aspects, and advantages of the present invention will become better understood when the following detailed description is read with reference to the accompanying drawings described herein. Reference is also made to the accompanying drawings that form a part hereof and in which is shown by way of illustration specific embodiments in which the invention may be practiced. These embodiments are described in sufficient detail to enable those skilled in the art to practice what is claimed and it is to be understood that other embodiments may be utilized and that logical, mechanical, and electrical changes may be made without departing from the spirit and scope of the claims. The following detailed description is, therefore, not to be taken in a limiting sense.

DETAILED DESCRIPTION

The present fuel cell systems architecture efficiently utilizes a front space of a vehicle to accommodate a fuel cell system for operating any kind of vehicles, e.g., trucks. That is, the preset fuel cell systems architecture provides specific arrangement of fuel cell stacks and efficient piping system that can replace power system of any truck size being used in any geographical region. In doing so, the present disclosure provides low cost and easy access for servicing and maintenance of each parts of the power system, radiator systems, and hydrogen supply systems.

Figure 1A:
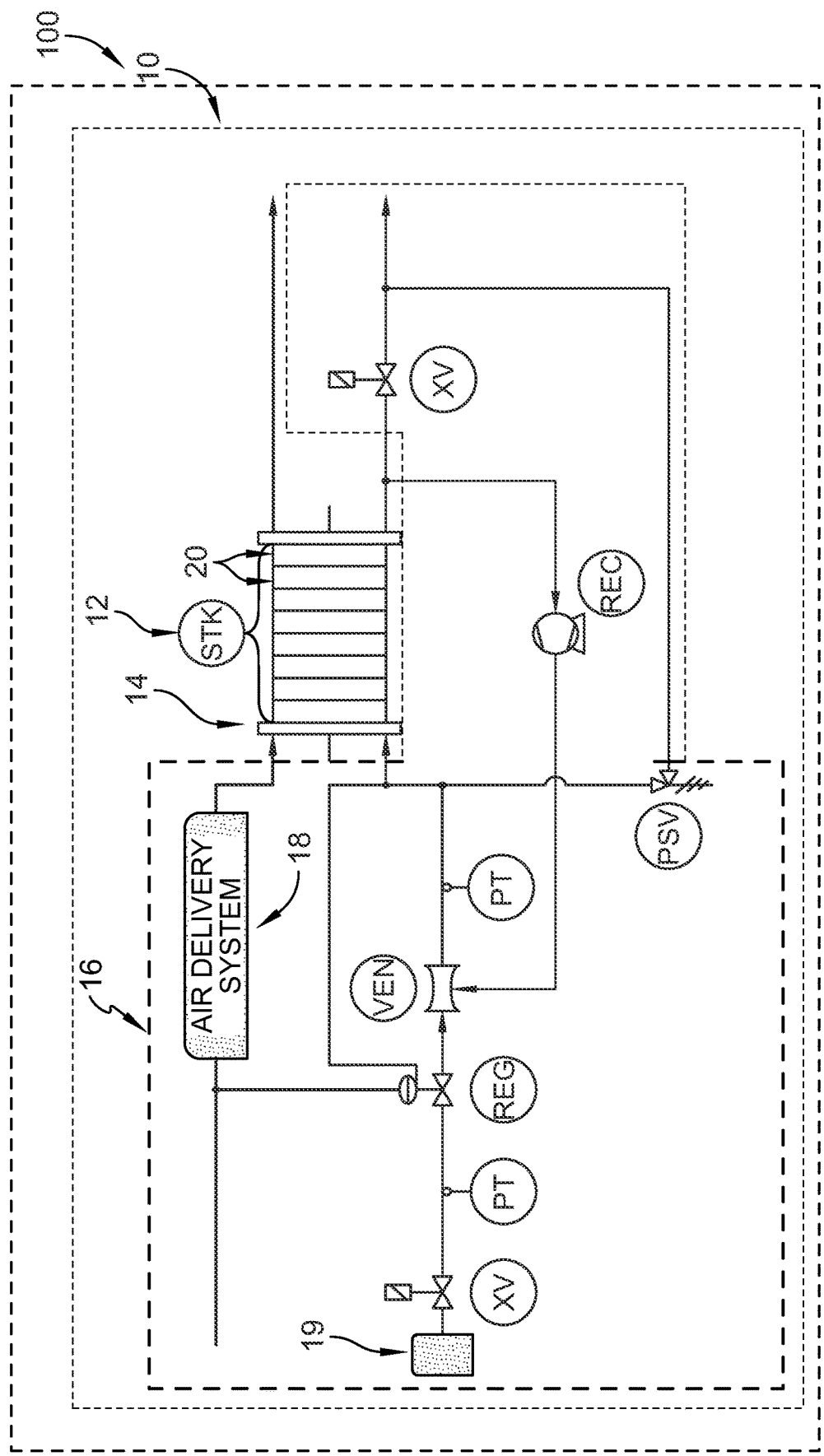
FIG. 1A is a schematic view of an exemplary fuel cell system including an air delivery system, a hydrogen delivery system, and a fuel cell module including a stack of multiple fuel cells.

As shown in FIG. 1A, fuel cell systems 10 often include one or more fuel cell stacks 12 or fuel cell modules 14 connected to a balance of plant (BOP) 16, including various components, to support the electrochemical conversion, generation, and/or distribution of electrical power to help meet modern day industrial and commercial needs in an environmentally friendly way. As shown in FIGS. 1B and 1C, fuel cell systems 10 may include fuel cell stacks 12 comprising a plurality of individual fuel cells 20. Each fuel cell stack 12 may house a plurality of fuel cells 20 assembled together in series and/or in parallel. The fuel cell system 10 may include one or more fuel cell modules 14 as shown in FIGS. 1A and 1B.

Each fuel cell module 14 may include a plurality of fuel cell stacks 12 and/or a plurality of fuel cells 20. The fuel cell module 14 may also include a suitable combination of associated structural elements, mechanical systems, hardware, firmware, and/or software that is employed to support the function and operation of the fuel cell module 14. Such items include, without limitation, piping, sensors, regulators, current collectors, seals, and insulators.

The fuel cells 20 in the fuel cell stacks 12 may be stacked together to multiply and increase the voltage output of a single fuel cell stack 12. The number of fuel cell stacks 12 in a fuel cell system 10 can vary depending on the amount of power required to operate the fuel cell system 10 and meet the power need of any load. The number of fuel cells 20 in a fuel cell stack 12 can vary depending on the amount of power required to operate the fuel cell system 10 including the fuel cell stacks 12.

The number of fuel cells 20 in each fuel cell stack 12 or fuel cell system 10 can be any number. For example, the number of fuel cells 20 in each fuel cell stack 12 may range from about 100 fuel cells to about 1000 fuel cells, including any specific number or range of number of fuel cells 20 comprised therein (e.g., about 200 to about 800). In an embodiment, the fuel cell system 10 may include about 20 to about 1000 fuel cells stacks 12, including any specific number or range of number of fuel cell stacks 12 comprised therein (e.g., about 200 to about 800). The fuel cells 20 in the fuel cell stacks 12 within the fuel cell module 14 may be oriented in any direction to optimize the operational efficiency and functionality of the fuel cell system 10.

The fuel cells 20 in the fuel cell stacks 12 may be any type of fuel cell 20. The fuel cell 20 may be a polymer electrolyte membrane or proton exchange membrane (PEM) fuel cell, an anion exchange membrane fuel cell (AEMFC), an alkaline fuel cell (AFC), a molten carbonate fuel cell (MCFC), a direct methanol fuel cell (DMFC), a regenerative fuel cell (RFC), a phosphoric acid fuel cell (PAFC), or a solid oxide fuel cell (SOFC). In an exemplary embodiment, the fuel cells 20 may be a polymer electrolyte membrane or proton exchange membrane (PEM) fuel cell or a solid oxide fuel cell (SOFC).

In an embodiment shown in FIG. 1C, the fuel cell stack 12 includes a plurality of proton exchange membrane (PEM) fuel cells 20. Each fuel cell 20 includes a single membrane electrode assembly (MEA) 22 and a gas diffusion layers (GDL) 24, 26 on either or both sides of the membrane electrode assembly (MEA) 22 (see FIG. 1C). The fuel cell 20 further includes a bipolar plate (BPP) 28, 30 on the external side of each gas diffusion layers (GDL) 24, 26, as shown in FIG. 1C. The above-mentioned components, in particular the bipolar plate 30, the gas diffusion layer (GDL) 26, the membrane electrode assembly (MEA) 22, and the gas diffusion layer (GDL) 24 comprise a single repeating unit 50.

The bipolar plates (BPP) 28, 30 are responsible for the transport of reactants, such as fuel 32 (e.g., hydrogen) or oxidant 34 (e.g., oxygen, air), and cooling fluid 36 (e.g., coolant and/or water) in a fuel cell 20. The bipolar plates (BPP) 28, 30 can uniformly distribute reactants 32, 34 to an active area 40 of each fuel cell 20 through oxidant flow fields 42 and/or fuel flow fields 44 formed on outer surfaces of the bipolar plates (BPP) 28, 30. The active area 40, where the electrochemical reactions occur to generate electrical power produced by the fuel cell 20, is centered, when viewing the stack 12 from a top-down perspective, within the membrane electrode assembly (MEA) 22, the gas diffusion layers (GDL) 24, 26, and the bipolar plate (BPP) 28, 30.

Figure 1D:
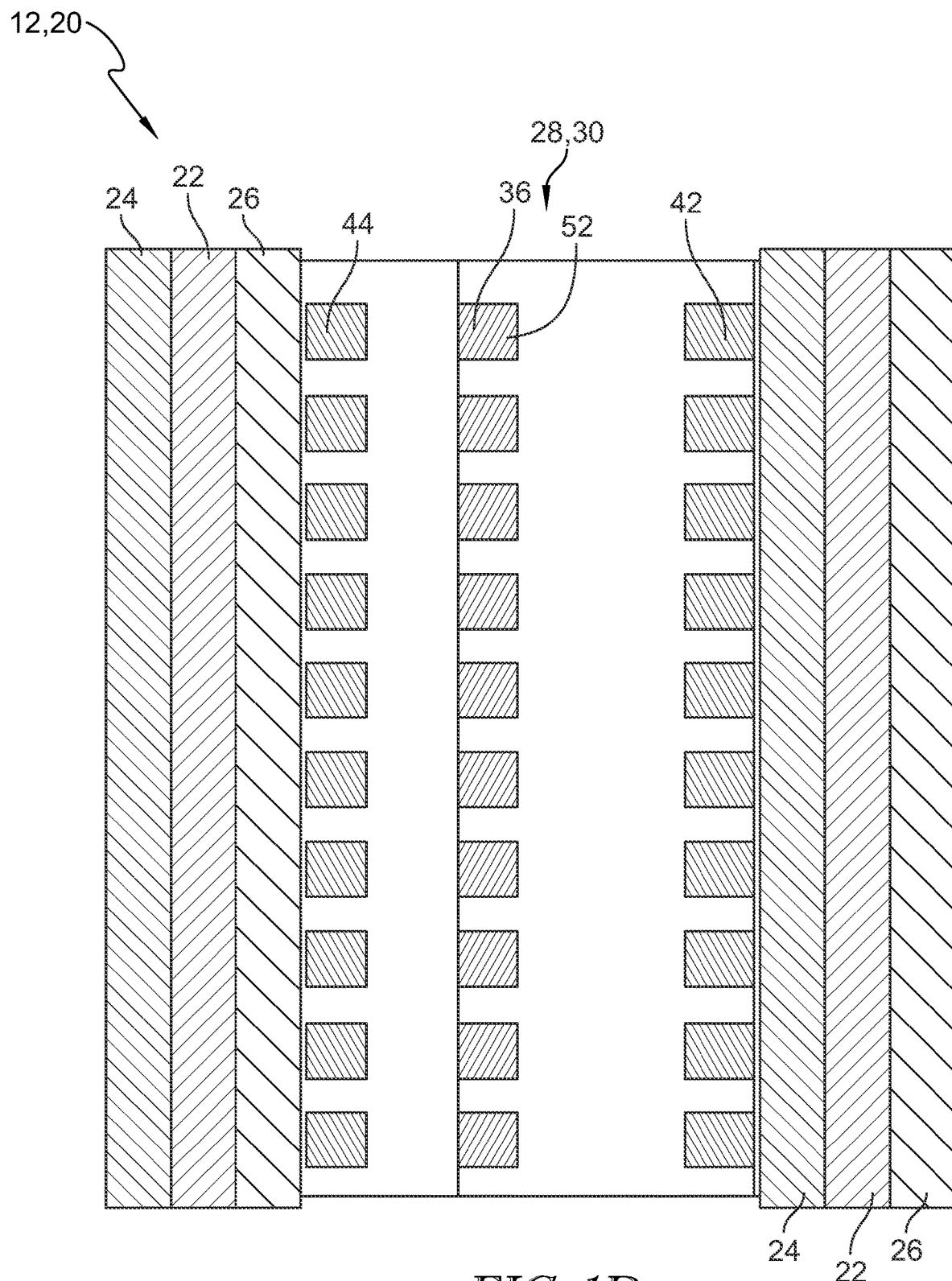
FIG. 1D is a cross-sectional view of an exemplary repeating unit of the fuel cell stack of FIG. 1C.

The bipolar plates (BPP) 28, 30 may each be formed to have reactant flow fields 42, 44 formed on opposing outer surfaces of the bipolar plate (BPP) 28, 30, and formed to have coolant flow fields 52 located within the bipolar plate (BPP) 28, 30, as shown in FIG. 1D. For example, the bipolar plate (BPP) 28, 30 can include fuel flow fields 44 for transfer of fuel 32 on one side of the plate 28, 30 for interaction with the gas diffusion layer (GDL) 26, and oxidant flow fields 42 for transfer of oxidant 34 on the second, opposite side of the plate 28, 30 for interaction with the gas diffusion layer (GDL) 24. As shown in FIG. 1D, the bipolar plates (BPP) 28, 30 can further include coolant flow fields 52 formed within the plate (BPP) 28, 30, generally centrally between the opposing outer surfaces of the plate (BPP) 28, 30. The coolant flow fields 52 facilitate the flow of cooling fluid 36 through the bipolar plate (BPP) 28, 30 in order to regulate the temperature of the plate (BPP) 28, 30 materials and the reactants. The bipolar plates (BPP) 28, 30 are compressed against adjacent gas diffusion layers (GDL) 24, 26 to isolate and/or seal one or more reactants 32, 34 within their respective pathways 44, 42 to maintain electrical conductivity, which is required for robust operation of the fuel cell 20 (see FIGS. 1C and 1D).

The fuel cell system 10 described herein, may be used in stationary and/or immovable power system, such as industrial applications and power generation plants. The fuel cell system 10 may also be implemented in conjunction with an air delivery system 18. Additionally, the fuel cell system 10 may also be implemented in conjunction with a hydrogen delivery system and/or a source of hydrogen 19 such as a pressurized tank, including a gaseous pressurized tank, cryogenic liquid storage tank, chemical storage, physical storage, stationary storage, an electrolysis system, or an electrolyzer. In one embodiment, the fuel cell system 10 is connected and/or attached in series or parallel to a hydrogen delivery system and/or a source of hydrogen 19, such as one or more hydrogen delivery systems and/or sources of hydrogen 19 in the BOP 16 (see FIG. 1A). In another embodiment, the fuel cell system 10 is not connected and/or attached in series or parallel to a hydrogen delivery system and/or a source of hydrogen 19.

The present fuel cell system 10 may also be comprised in mobile applications. In an exemplary embodiment, the fuel cell system 10 is in a vehicle and/or a powertrain 100. A vehicle 100 comprising the present fuel cell system 10 may be an automobile, a pass car, a bus, a truck, a train, a locomotive, an aircraft, a light duty vehicle, a medium duty vehicle, or a heavy-duty vehicle. Type of vehicles 100 can also include, but are not limited to commercial vehicles and engines, trains, trolleys, trams, planes, buses, ships, boats, and other known vehicles, as well as other machinery and/or manufacturing devices, equipment, installations, among others.

The vehicle and/or a powertrain 100 may be used on roadways, highways, railways, airways, and/or waterways. The vehicle 100 may be used in applications including but not limited to off highway transit, bobtails, and/or mining equipment. For example, an exemplary embodiment of mining equipment vehicle 100 is a mining truck or a mine haul truck.

In addition, it may be appreciated by a person of ordinary skill in the art that the fuel cell system 10, fuel cell stack 12, and/or fuel cell 20 described in the present disclosure may be substituted for any electrochemical system, such as an electrolysis system (e.g., an electrolyzer), an electrolyzer stack, and/or an electrolyzer cell (EC), respectively. As such, in some embodiments, the features and aspects described and taught in the present disclosure regarding the fuel cell system 10, stack 12, or cell 20 also relate to an electrolyzer, an electrolyzer stack, and/or an electrolyzer cell (EC). In further embodiments, the features and aspects described or taught in the present disclosure do not relate, and are therefore distinguishable from, those of an electrolyzer, an electrolyzer stack, and/or an electrolyzer cell (EC).

As shown in FIG. 1A, 'XV' refers to an on/off valve, 'PT' refers to a pressure transducer, 'REG' refers to a mechanical regulator, 'VEN' refers to a venturi, 'PSV' refers to a pressure transfer valve, and 'REC' refers to a recirculation pump.

Specifically, the present disclosure is directed to a modular power system 101 comprising a modular fuel cell system 10 to provide power to a vehicle 600. The present disclosure also relates to a modular radiator system 400 for cooling the modular power system 101. The present disclosure also relates to a modular fuel supply system 700 to provide fuel (e.g., hydrogen) to the fuel cell system 10 onboard of the vehicle 600.

A vehicle 600 of the present disclosure may be a truck 600. A truck of the present disclosure may be any type of truck, including but not limited to a semi-truck, a dump truck, a hauling truck, a pickup truck, an open bed truck, a truck and trailer, a delivery truck, a food truck, or any other type of truck. In an exemplary embodiment, the truck is a mining haul truck (see FIG. 7A). In other embodiments, the vehicle 600 is not a truck at all.

The vehicle 600 may be a light duty vehicle, a medium duty vehicle, or a heavy duty vehicle (e.g., a mining haul truck). For example, in some embodiments, the vehicle 600 is a bus. In further embodiments the vehicle 600 is an automobile, a passenger car, a bus, a trolley, a tram, a train, a locomotive, a plane, a boat, an aircraft, or any other type of vehicle.

The vehicle 600 of the present system may include but is not limited to a hybrid vehicle. A typical hybrid powertrain or vehicle 600 may comprise at least two different types of power sources (e.g., an engine, a fuel cell, a battery, etc.). In an illustrative embodiment, as shown in FIGS. 2A-2B, the vehicle 600 may comprise the fuel cell system/module 14 and a battery system/module 120.

Figure 7A:
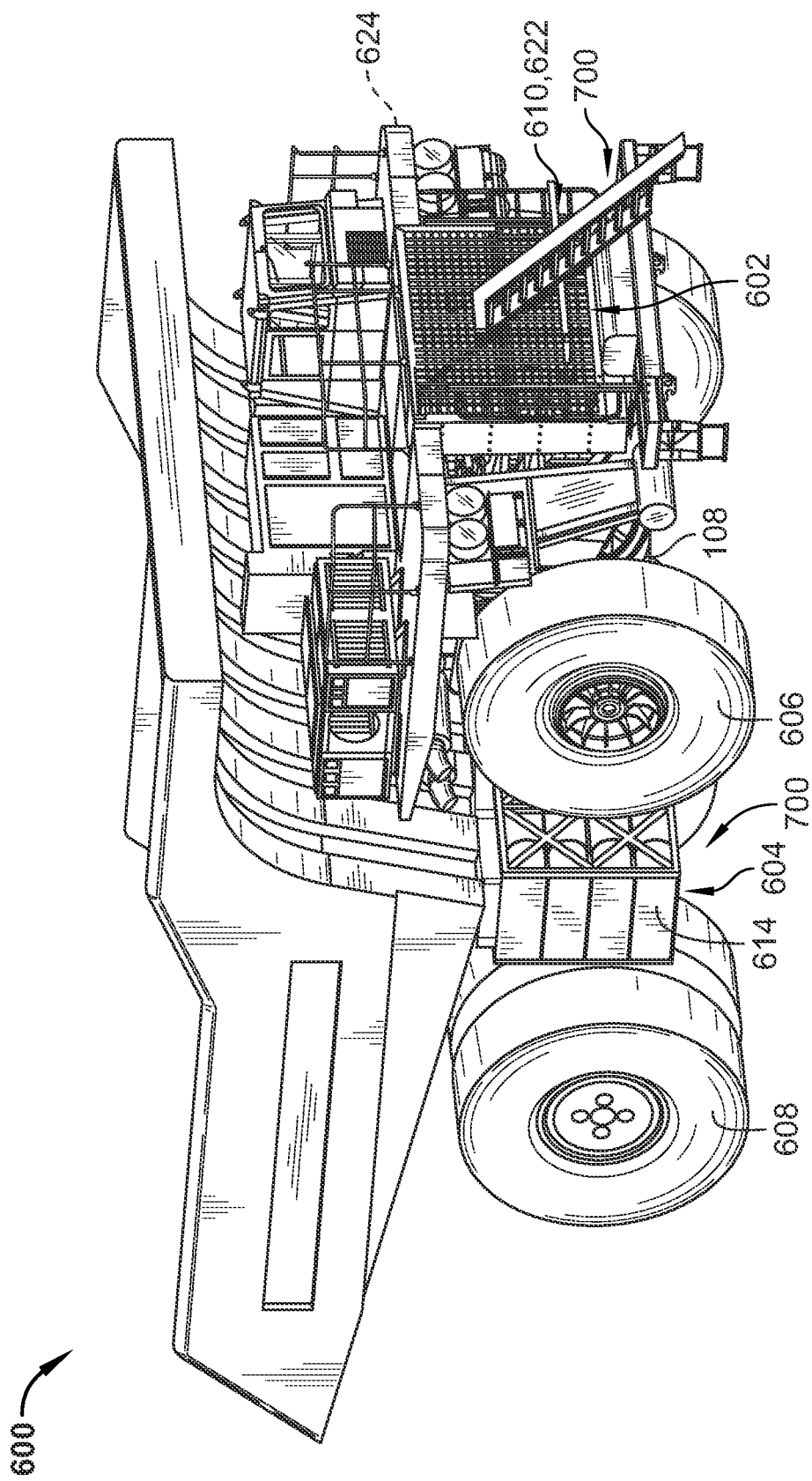
FIG. 7A is a perspective view of an embodiment of a hybrid vehicle comprising a modular fuel supply system to provide hydrogen to an onboard fuel cell system.

In an exemplary embodiment, a vehicle is conventionally and/or currently configured to comprise an engine power source 602 (e.g., a diesel engine), as shown in FIG. 7A. The engine power source 602 components (i.e., a diesel engine) of the vehicle 600 may be interchanged or exchanged with the modular power system 101 and/or components of the present disclosure to become a hybrid vehicle 600 of the present disclosure. Moreover, completion of such a transition may transform a conventional non-hybrid vehicle comprising a single engine power source 602 in the current art into a hybrid vehicle 600 of the present disclosure comprising multiple power sources (e.g., a fuel cell system 10 and a battery 122) in a modular power system 101. The ability of the present modular power system 101 to be exchanged, substituted, replaced, and/or interchanged (e.g., swapped out) with a conventional diesel or internal combustion engine results in higher efficiency operations and environmentally cleaner performance of the modular power sources and the hybrid vehicle 600 overall.

Figure 2B:
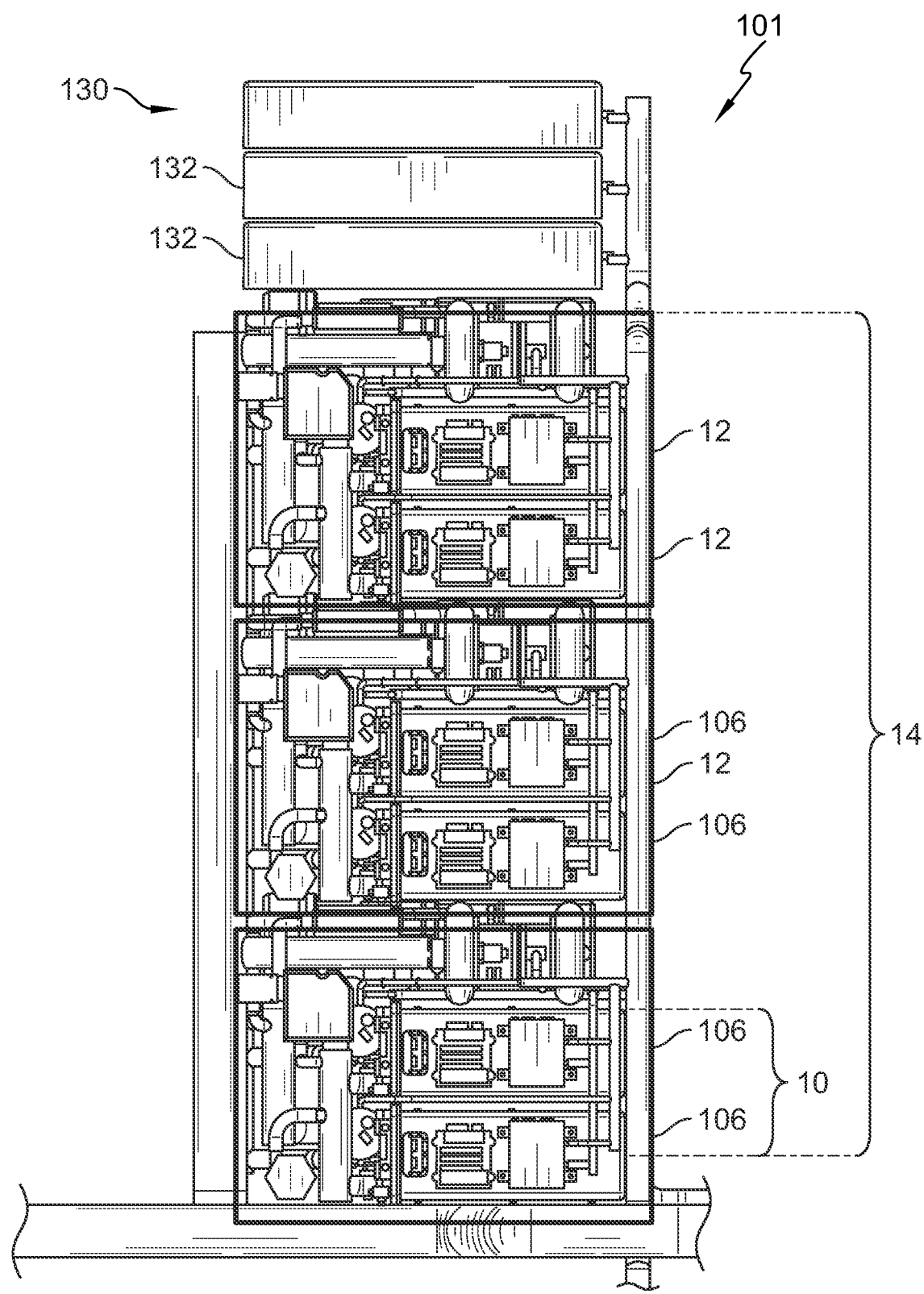
FIG. 2B is a top view of an embodiment of the modular power system of FIG. 2A.
Figure 3:
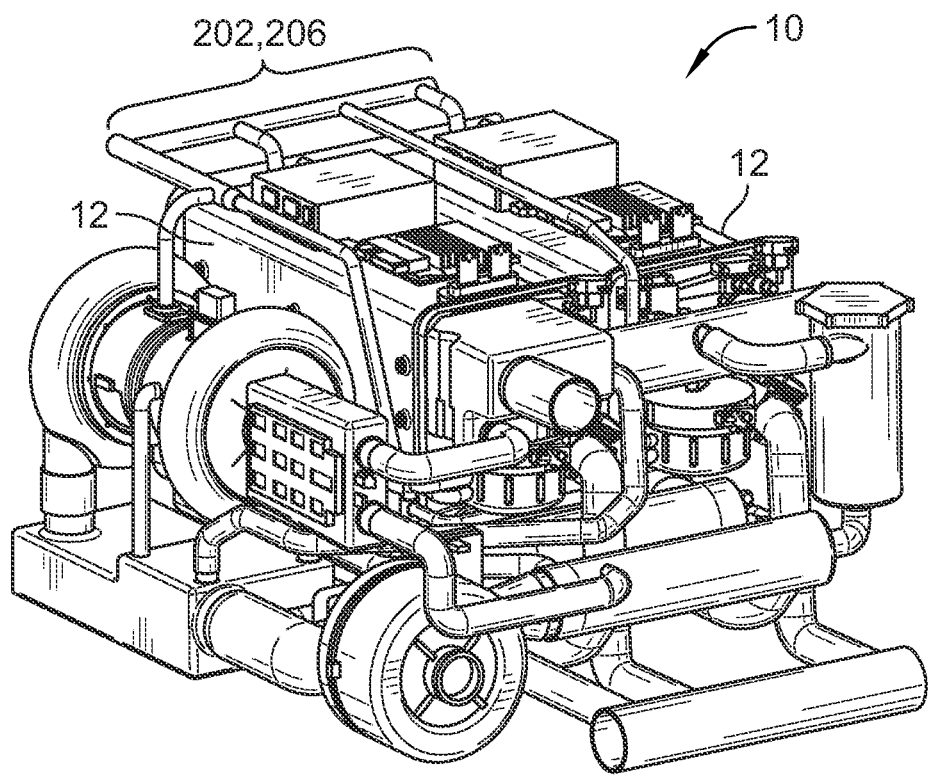
FIG. 3 is a perspective view of an embodiment of a modular fuel cell system to provide power to a vehicle.

FIGS. 2A and 2B illustrate the modular power system 101 that is able to provide power to such a vehicle. FIG. 2A is a front view of the modular power system 101, while FIG. 2B is a top view of the modular power system 101. The modular power system 101 includes a fuel cell module 14 having a plurality of fuel cell stacks 106.

As shown in FIG. 2B, the plurality of fuel cell stacks 106 include individual fuel cell stacks 12. Each of the fuel cell stack 12 include a plurality of fuel cells 20 within an enclosure or a casing 110 (see FIG. 4). In an exemplary embodiment, the fuel cells 20 of the plurality of the fuel cells 20 may be a proton exchange membrane (PEM) fuel cell 20.

Power demanded during a standard mining truck operation may typically requires about 400 fuel cells 20 to about 600 fuel cells 20 comprised in about 4-10 fuel cell stacks 12 to provide a plurality of fuel cell stacks 106. The fuel cells 20 within the fuel cell module 14 are oriented to optimize fuel cell module 14 integration onto the vehicle 600. The fuel cells 20 may be oriented so that anode and cathode gases flow in a net downward vertical direction. Additionally or alternatively, the fuel cells 20 may be oriented so that anode and cathode gases flow in a counter flow direction to each other.

Figure 4:
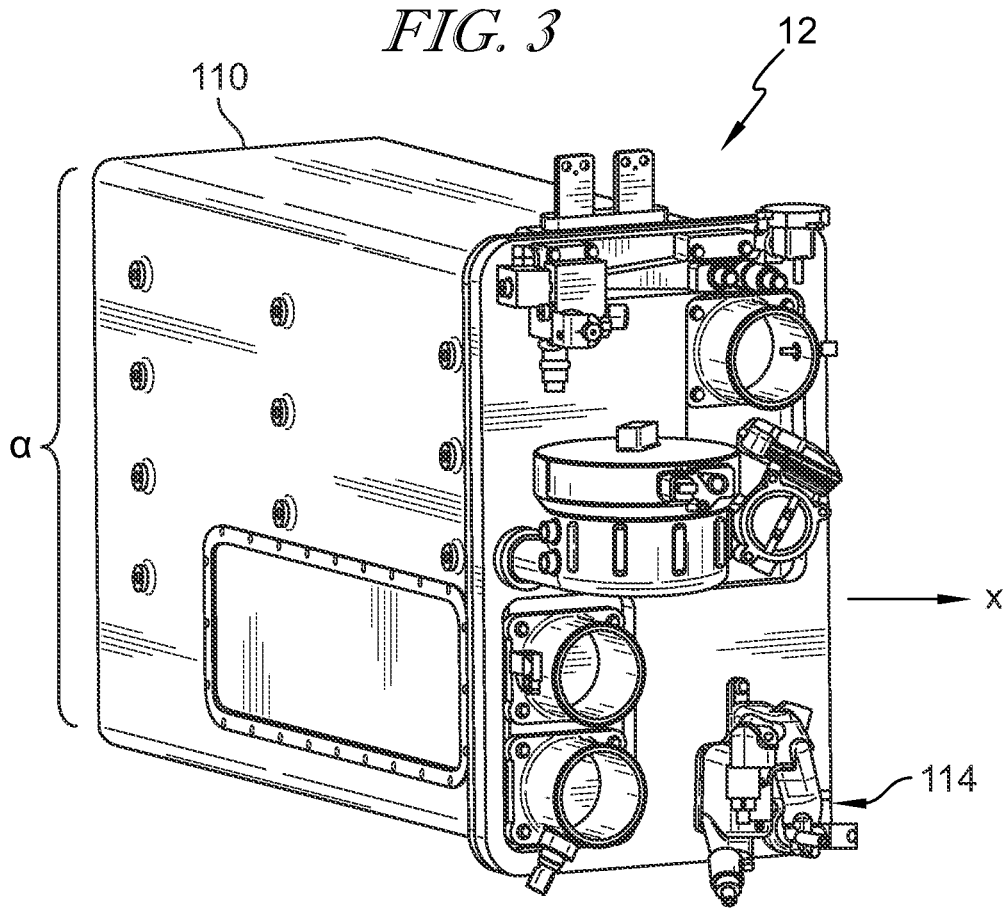
FIG. 4 is a perspective view of a fuel cell stack embodiment of the fuel cell system of FIG. 3.

Each fuel cell stack 12 in the plurality of fuel cell stacks 106 may be arranged on the modular power system 101 in a vertical orientation. FIG. 4 illustrates the individual fuel cell stack 12 positioned in a vertical orientation as comprised in the modular power system of FIGS. 2A and 2B. The vertical orientation of the fuel cell stacks 12, 106 may be arranged in planes located above and perpendicular to a chassis 108 of the vehicle 600 (see FIG. 2A).

Referring back to FIG. 4, the vertical orientation of each fuel cell stack 12, 106 is due to a 90 degree angle rotation of the fuel cell stack 12 with respect to an axis X that is parallel to the chassis 108 of the vehicle 600 (see FIG. 2A). Accordingly, the vertical orientation of the fuel cell stacks 12, 106 is in a plane that is perpendicular to the chassis 108 of the vehicle 600. The fuel cells are oriented at −90 degrees when the fuel cell module 14 is oriented at 90 degrees. FIG. 6B shows each fuel cell stack 12 oriented in a plane A that is perpendicular to the chassis 108. In the vertical orientation, the flow of reactants between fuel cells 20 in the fuel cell stack 12 are designed to maximize the effect of gravity.

Figure 8A:
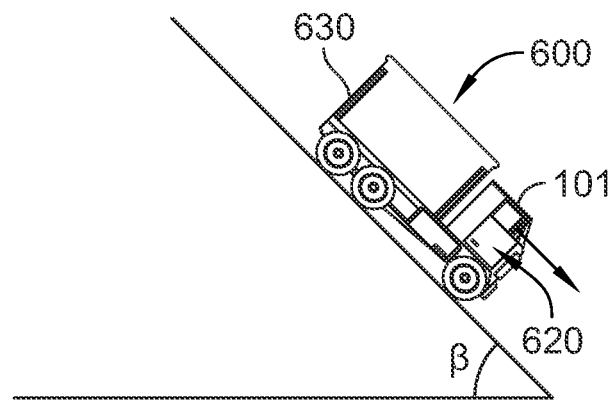
FIG. 8A is a side view of an embodiment of a hybrid vehicle on an elevated surface.
Figure 8B:
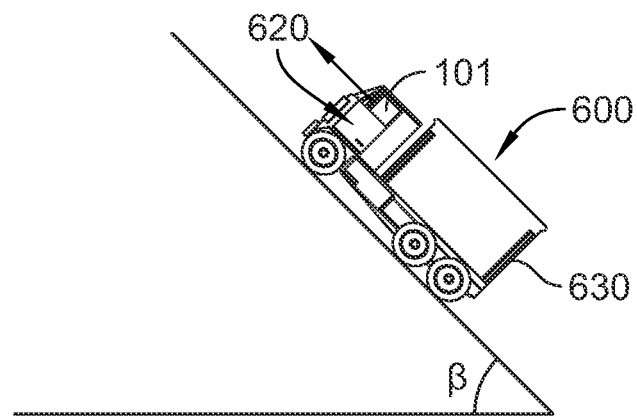
FIG. 8B is a different side view of an embodiment of a hybrid vehicle on an elevated surface.
Figure 8C:
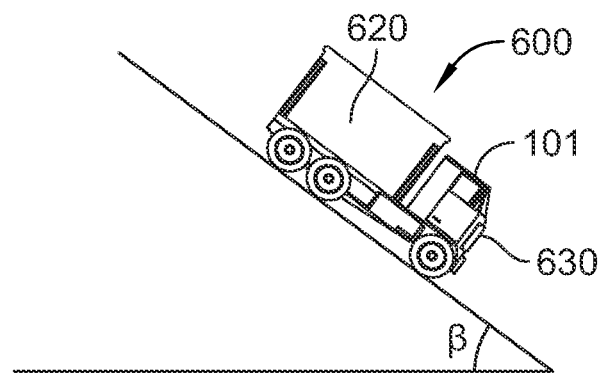
FIG. 8C is a front view of an embodiment of a hybrid vehicle on an elevated surface.

Specifically, by having each fuel cell stack 12 oriented vertically (i.e., in planes perpendicular to the chassis 108), a water drain 114 from the fuel cell module 14 is designed to ensure gravity will drain the water evenly and/or uniformly when the vehicle 600 is operating at various levels of angularity (see FIG. 4). FIGS. 8A-8C show various levels of angularity for the vehicle 600.

FIG. 8A illustrates a side view of a vehicle 600 moving downhill on a surface with an angle β. The vehicle 600 has a front part 620 and a back part 630. The front part 620 of the vehicle 600 including the modular power system 101 is facing down or downward (i.e., toward the ground).

FIG. 8B shows a different side view of the vehicle 600 on a surface with an angle β moving uphill. The vehicle 600 has a front part 620 and a back part 630. The front part 620 of the vehicle 600 including the modular power system 101 is angled up or upward (i.e., toward the sky).

FIG. 8C is a front view of the vehicle 600 including the modular power system 101 in a horizontal configuration and moving uphill. The vehicle 600 has a front part 620 and a back part 630. The front side and back side of the modular power system 101 are on a same or similar elevation. Angle β may range 5 degrees to 60 degrees, including any specific or range of angularity comprised therein.

Generally, conventional or current fuel cell stacks 12 are oriented such that a side a of the enclosure casing 110 (shown in FIG. 4) lies along the X axis parallel to the chassis 108. This is referred to herein as a standard fuel cell orientation. Accordingly, the standard orientation of the fuel cell stack 12 is located in a plane parallel to the chassis 108.

As stated above, and illustrated in FIG. 6B, each fuel cell stack 12 of the present modular fuel cell system 10 is located in plane A and/or a plane that is parallel to plane A. Plane A and any additional planes parallel to plane A are vertical, and/or perpendicular to the chassis 108. Similarly, plane A and any additional planes parallel to plane A are vertical and/or perpendicular to a standard fuel cell orientation. Therefore, the present fuel cell stacks 12, 106 and modular fuel cell system 10 are not oriented and do not lie in the standard fuel cell orientation.

FIGS. 2B, 3, 6A, and 6B illustrate a modular fuel cell system 10 comprising one or more fuel cell stack pairs 202. A fuel cell stack pair 202 includes a group of two fuel cell stacks 12 that are electrically and/or electronically connected in series. Fuel cell stacks 12 can be electrically and/or electronically connected in series as a group 206 comprising one or more fuel cell stack pair 202. One of the advantages of connecting the fuel cell stacks 12 in the fuel cell stack pair 202 is maximizing an output voltage of the fuel cell module 14. In some embodiments, the fuel cell stack pair 202 has an output voltage of about or greater than 660 V.

Similar to the modular fuel cell system 10 described above, all of the fuel cell stack pairs 202 of the fuel cell module 14 are located in plane A or a plane that is parallel to plane A and parallel to the vehicle chassis 108. In some embodiments, the fuel cell stack pairs 202 are located in one or more planes that are all parallel to the chassis 108.

Depending on size of the vehicle 600 and/or the amount of power required to operate the vehicle 600, the number of planes upon which the fuel cell stack pairs 202 are located can be varied and numerous. If the vehicle 600 needs substantial amounts of power for operation, it may require more fuel cell stacks 12 and therefore, more fuel cell stack pairs 202, resulting in one or more planes that include various fuel cell stack pairs 202. For example, if the vehicle 600 is a truck, the fuel cell module 14 may include more fuel cell stacks 12, 106 and fuel cell pairs 202 than when the vehicle 600 is an automobile sedan. In some exemplary embodiments, the vehicle 600 may be a heavy duty mining haul truck, as shown in FIG. 7A.

Referring back to FIGS. 2A and 3, the fuel cell stacks 12 of the fuel cell stack pairs 202 of the fuel cell module 14 may all be electrically connected in parallel. Therefore, each fuel cell stack pair 202 of the fuel cell module 14 is capable to operate independently from any other fuel cell stack pair 202. Accordingly, each fuel cell stack pair 202 can be turned on, off, and/or regulated individually without distracting and/or disrupting the operation of the remaining fuel cell stack pairs 202 based on power and operational requirement of the vehicle 600.

Similarly, each fuel cell stack 12 can be turned on, off, and/or regulated individually without distracting and/or disrupting the operation of the remaining fuel cell stacks 12, 106 based on power and operational requirement of the vehicle 600. The ability of the present modular power system 101 to control and manipulate the power demand provided to the vehicle 600 by each power source (e.g., the fuel cell 20 or battery 122), particularly the fuel cell stacks 12, 106 and fuel cell pairs 202, may result in higher efficiency operations and performance of the power sources and the vehicle 600 than conventional vehicles with engines.

There may be an additional and/or alternative advantage of having the fuel cell stacks 12 arranged in a group 206 of fuel cell stack pairs 202 and then electrically connecting the fuel cell stack pairs 202 in parallel. Such a configuration may enable ease of maintenance and replacement of any identified fuel cell stack 12 in a defective, damaged, dysfunctional, and/or nonoperational fuel cell stack pair 202 without the need to disassemble the entire fuel cell module 14 or the plurality of fuel cell stacks 106. Further, this arrangement of the fuel cell stacks 12 may efficiently utilizes the available space upon, within, and/or atop the vehicle 600 without reducing the operational power capacity and off/on operational efficiency provided to the vehicle 600.

Another advantage of having the fuel cell stacks 12 in fuel cell stack pair 202 arrangements may be to provide for situations when one or more fuel cell stack pairs 202 are nonoperational. In these situations, the remaining fuel cell stack pairs 202 can be utilized for operations to get the vehicle 600 to its destination. Therefore, the fuel cell stack pair 202 arrangement enables the vehicles 600 to continue its route and destination and not be locked up in its place. This level of redundancy is one of the important features for high-value applications like those used in expensive vehicles and vessels for Mobile Off-Highway operation.

In some embodiments, the fuel cell stacks 12 may be arranged to include a plurality of fuel cell stacks 12. For example, three, four, five, six, seven, eight, nine, ten or more fuel cell stacks 12 may be arranged together. As a result, the fuel cell stack pairs 202 may also be configured to be arranged in a fuel cell stack group 206 comprising a plurality of fuel cell stacks 12 electronically connected in series. All the fuel cell stacks 12 arranged in one fuel cell stack group 206 may be electronically connected in series, similar to the fuel cell stack pairs 202. As stated above, the fuel cell stack groups 206 may be electronically connected in parallel. Accordingly, the groups 206 of fuel cell stacks 12 may function similarly to the fuel cell stack pairs 202 in the modular power system 101.

Referring back to FIGS. 2A and 2B, in addition to the fuel cell module 14, the modular power system 101 also includes the battery module 120. The battery module 120 is electrically connected to the fuel cell module 14. In one embodiment, the battery module 120 includes may include a plurality of batteries 122 arranged in one or more battery stacks 124. The number of the battery stacks 124 and the number of the batteries 122 in each battery stack 124 can vary for each vehicle 600 based on its specific applications.

In one exemplary embodiment as shown in FIG. 2A, the battery module 120 includes five battery stacks 124. Similar to the fuel cell stacks 12, 106 above, each battery stack 124 is arranged in a plane that is vertical to the chassis 108 (e.g., plane A) of the vehicle 600. Each battery stack 124 can include one or more, multiple, or many batteries 122 (e.g., a plurality of batteries 122).

The batteries 122 of the battery stacks 124 may be located and/or oriented in one or more planes directly above and in contact with the chassis 108. In some embodiments, the battery stacks 124 can also be located in planes parallel to the chassis 108, but directly below the chassis 108. In some embodiments, the battery stacks 124 are located in planes parallel to the chassis that are directly above and/or directly below the chassis 108.

The battery module 120 may be located directly above the chassis 108 to keep the center of gravity of the vehicle 600 low. As the battery module 120 is much heavier than the fuel cell module 14, the battery module 120 provides a good structural base for the fuel cell module 14 to reside on in order to reduce or prevent the interference, movement, jostling, vibrations, and/or any resulting damage experienced by the fuel cell module 14 during a vehicle 600 route. The batteries 122 of the battery module 120 may also be located in one or more planes parallel to the fuel cell module 14 and/or the chassis 108. In the illustrative embodiment of FIG. 2A, the batteries 122 of the battery stacks 124 and the battery module 120 are located in one or more planes parallel to and between the fuel cell module 14 and the chassis 108 of the vehicle 600.

The number of the batteries 122 comprised in the battery module 120 or each battery stack 124 depends on the number of fuel cell stacks 12 also housed in the modular power system 101. The number of batteries 122 also depends on the amount of the power required to operate the vehicle 600. Further, depending on the operation mode and power demand required, one or more batteries 122 of the plurality of batteries can be operational at a single time. This ability of the present modular power system 101 to control and manipulate the power demand provided to the vehicle 600 by each power source (e.g., the fuel cell 20 or battery module 120), particularly the battery stacks 124 and batteries 122, results in higher efficiency operations and performance of the power sources and the vehicle 600 than conventional vehicles with engines.

In one embodiment, both the battery module 120 and the fuel cell module 14 are located in a front portion or part 620 of the vehicle 600 ("the front of the vehicle"). In one embodiment, the battery module 120 is located in an internal or external front portion 620 of the vehicle 600 and below a deck 624 where electrical cabinets 622 reside. In some embodiments, both the battery module 120 and the fuel cell module 14 are individual units that can be accessed, serviced, and/or replaced separately and individually. In one embodiments, an entire power module (e.g., engine power source 602) of a vehicle 600 can be removed or pulled out to insert a new power module, such as the modular power system 101 of the present disclosure.

In an exemplary vehicle embodiment, a non-hybrid mining truck (e.g., a diesel engine truck) 600 may have its engine power source 602 removed and interchanged with the modular power system 101 of the present disclosure to become a hybrid mining truck. The hybrid mining truck 600 comprises a fuel cell module 14, a battery module 120, and no engine module as its power sources. The modularity of the present power system 101 enables the time efficient exchange of the hybrid power sources with the engines to provide advantageous transformation of a non-hybrid vehicle into a hybrid vehicle 600.

Optionally, the modular power system 101 further includes a voltage converter module 130. The voltage converter module 130 may be located in a same plane as the fuel cell module 14 (see FIGS. 2A, 2B, 6A, and 6B). The voltage converter module 130 may be located adjacent to the fuel cell module 14 and may be located on the same plane (e.g., plane A). In such embodiments, the voltage converter module 130 may be located above the chassis 108 and the battery module 120 of the vehicle 600.

The voltage converter module 130 converts the output voltage of the fuel cell module 14 to an operating voltage for the vehicle 600. The voltage converter module 130 may include one or more voltage converters 132 (see FIG. 2A). In one embodiment, the one or more voltage converters 132 are DC/DC converters. As stated above, each component of the modular power system 101 can be serviced or replaced individually without a need to remove or service the whole unit. That is, the fuel cell module 14, the battery module 120, and the voltage converter module 130 can each be serviced for maintenance or repair and have specific power components (e.g., fuel cells or stacks, batteries, or converters) replaced therein individually and/or simultaneously while operational in order to maintain operational power of the vehicle 600.

In one embodiment (not shown), the voltage converter module 130 is not located within the modular power system 101. In some embodiments, the voltage converter module 130 is located remotely with respect to modular power system 101. Specifically, the voltage converter module 130 of the present modular power system 101 may be configured to be remotely connected to the voltage converter module 130 of the present modular power system 101, such that the voltage converter module does not locally reside on the modular power system 101.

The modular power system 101 of the present vehicle 600 may also be configured to be connected to the modular radiator system 400. The modular radiator system 400 may also be located in front of the vehicle 600, such as in a position forward of a plurality of back wheels of the vehicle, and adjacent to the modular power system 101 comprising the fuel cell module 14, the battery module 120, and/or the voltage converter module 130.

Figure 5:
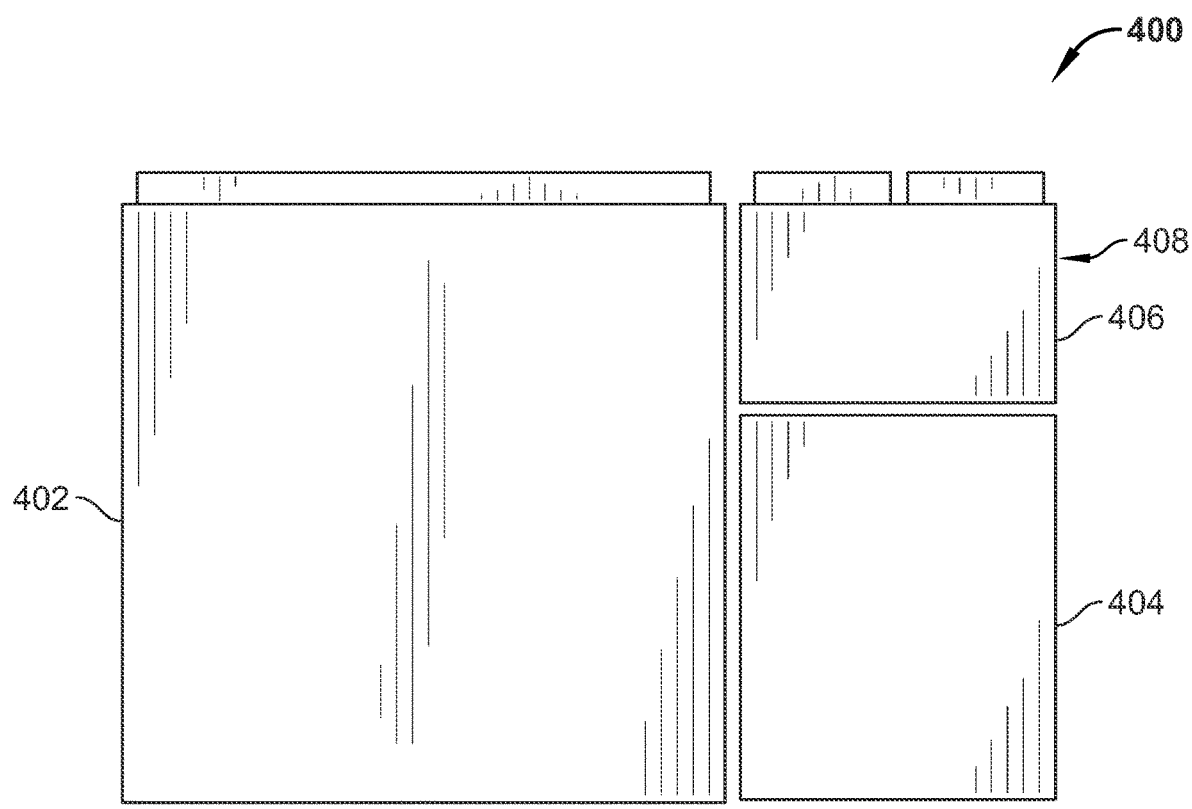
FIG. 5 is a schematic illustrating an embodiment of a modular radiator system for cooling the modular power system of FIG. 2A.

FIG. 5 shows an embodiment of the modular radiator system 400 for cooling the modular power system 101. Each component of the modular radiator system 400 is responsible for cooling a separate component of the modular power system 101. Shroud and fans 408 may be implemented for pulling the ambient air through radiators 402, 404, 406 including the modular radiator system 400 in the vehicle 600.

In one embodiment, the modular radiator system 400 includes only two radiators, the first radiator 402, and the second radiator 404. In this two-radiator modular embodiment 400, the modular power system 101 only includes the first radiator 402 for the fuel module 14 and the second radiator 404 for the battery module 120. In one exemplary embodiment, the modular radiator system 400 includes a first radiator 402, a second radiator 404, and a third radiator 406.

The first radiator 402 is responsible for cooling the fuel cells 20 and fuel cell stacks 12 of the fuel cell module 14. The second radiator 404 is for cooling the batteries 122 and battery stacks 124 of the battery module 120. Further, the modular radiator system 400 may include a third radiator 406 for cooling a power electronics system 420 and/or a voltage converter module 130 of the vehicle 600.

As shown in FIG. 5, the first radiator 402 is generally the largest component of the modular radiator system 400. Radiator cooling of the most heat-generative power component, the fuel cell module 14, also requires the largest size and/or highest capacity. In an illustrative embodiment, the first radiator 402 may range in size and/or have cooling capacity able to reject about 1600 kW to about 2000 kW of heat, including any specific or range of heat comprised therein, at an ambient temperature up to about 50° C. A frontal area of the first radiator 402 has a size of about 3 $m^2$ to about 5 $m^2$, including any specific or range of sizes comprised therein.

The second radiator 404 to cool the battery module 120 is located adjacent to the first radiator 402 and often below the third radiator 406. Typically, the second radiator 404 is significantly smaller in size and/or cooling capacity as compared to the first radiator 402. In an illustrative embodiment, the size or area of a frontal area of the second radiator 404 comprises about 1 $m^2$ to about 3 $m^2$, including any specific or range of area or sizes comprised therein.

The third radiator 406 is located adjacent to the first radiator 402 and the second radiator 404. The third radiator 406 is usually located above the second radiator 404 and away from and atop the chassis 108 of the vehicle 600. Typically, the third radiator 406 is the smallest due to it having the lowest cooling demand as compared to the first radiator 402 and the second radiator 404. In an illustrative embodiment, a size of the frontal area of the third radiator 406 ranges from about 0.5 $m^2$ to about 2 $m^2$, including any specific or range of sizes or areas comprised therein.

Referring back to FIGS. 6A and 6B, the modular radiator system 400 includes a piping system 150 to deliver a coolant 152 to each respective component of the modular power system 101. The coolant 152 is important to cool the components (e.g., the fuel cell module 14, battery module 120, voltage converter module 130, and/or power electronics system 420) during operation. In one embodiment, the piping system 150 includes independent coolant pipes 154 for each of the first radiator 402, the second radiator 404, and the third radiator 406. In one embodiment, the piping system 150 includes a coolant 152 for one or more or each of the first radiator 402 (i.e., a first coolant 156), the second radiator 404 (i.e., a second coolant 158), and the third radiator 406 (i.e., a third coolant 160).

In some embodiments, the first, second and third coolants 156, 158, 160 can be similar, substantially similar, or the same. In some embodiments, two of the coolants 156, 158, 160 may be similar. For example, the first coolant 156 and the second coolant 158 can be similar, substantially similar, or the same, and different from the third coolant 160. In one embodiment, the second coolant 158 and the third coolant 160 can be similar or the same, and different from the first coolant 156. In another embodiment, the first coolant 156 and the third coolant 160 can be similar, substantially similar, or the same, and different from the second coolant 158.

In an exemplary embodiment, the piping system 150 includes a different coolant 152 for each of the first radiator 402, the second radiator 404, and the third radiator 406. Specifically, the coolant 152 for the modular radiator system 400 can include three separate, distinct, and/or independent coolants 152 for each of the first radiator 402, the second radiator 404, and the third radiator 406. Therefore, the first coolant 156, the second coolant 158, and the third coolant 160 may each be different from one or more of each other.

For example, the first coolant 156 and the second coolants 158 can be different from each other and/or the third coolant 160. In one embodiment, the second coolant 158 and the third coolants 160 can be different from each other and/or the first coolant 156. In another embodiment, first coolant 156 and the third coolants 160 can be different from each other and/or the second coolant 158. In an exemplary embodiment, the first coolant 156, the second coolant 158, and the third coolant 160 are all different and/or substantially different from one another.

Specifically, the first coolant 156, the second coolant 158, and the third coolant 160 may be different compositions. Additionally, the first coolant 156, the second coolant 158, and the third coolant 160 may comprise different active compounds from one another. The first coolant 156, the second coolant 158, and the third coolant 160 may also comprise different inactive compounds from one another.

Referring back to FIG. 6A, a first coolant pipe 162 may deliver the first coolant 156 from the first radiator 402 to the fuel cell module 14 through a first outlet pipe 502. The first coolant pipe 162 may also return the first coolant 156 from the fuel cell module 14 back to the first radiator 402 through a first inlet pipe 503. In some embodiments, the first outlet pipe 502 may be a single pipe delivering the first coolant 156 from the first radiator 402 to each fuel cell stack 124 in the plurality of fuel cell stacks 106 of the module 14. Alternatively, or additionally, the first inlet pipe 503 may be a single pipe returning the first coolant 156 from each fuel cell stack 12 to the first radiator 402.

These features of having a single pipe or tubing configured to be attached and/or connected to each coolant outlet and inlet of each fuel cell stack 12 of the plurality of fuel cell stacks 106 is advantageous. Such a modular and interconnected configuration of the modular power system 101 and modular radiator system 400 enables delivery of the first coolant 156 to all fuel cell stacks 12 and return of the first coolant 156 from all fuel cell stacks 12, 106, which reduces the space needed for the piping system 150 and also reduces overall cost.

Figure 6A:
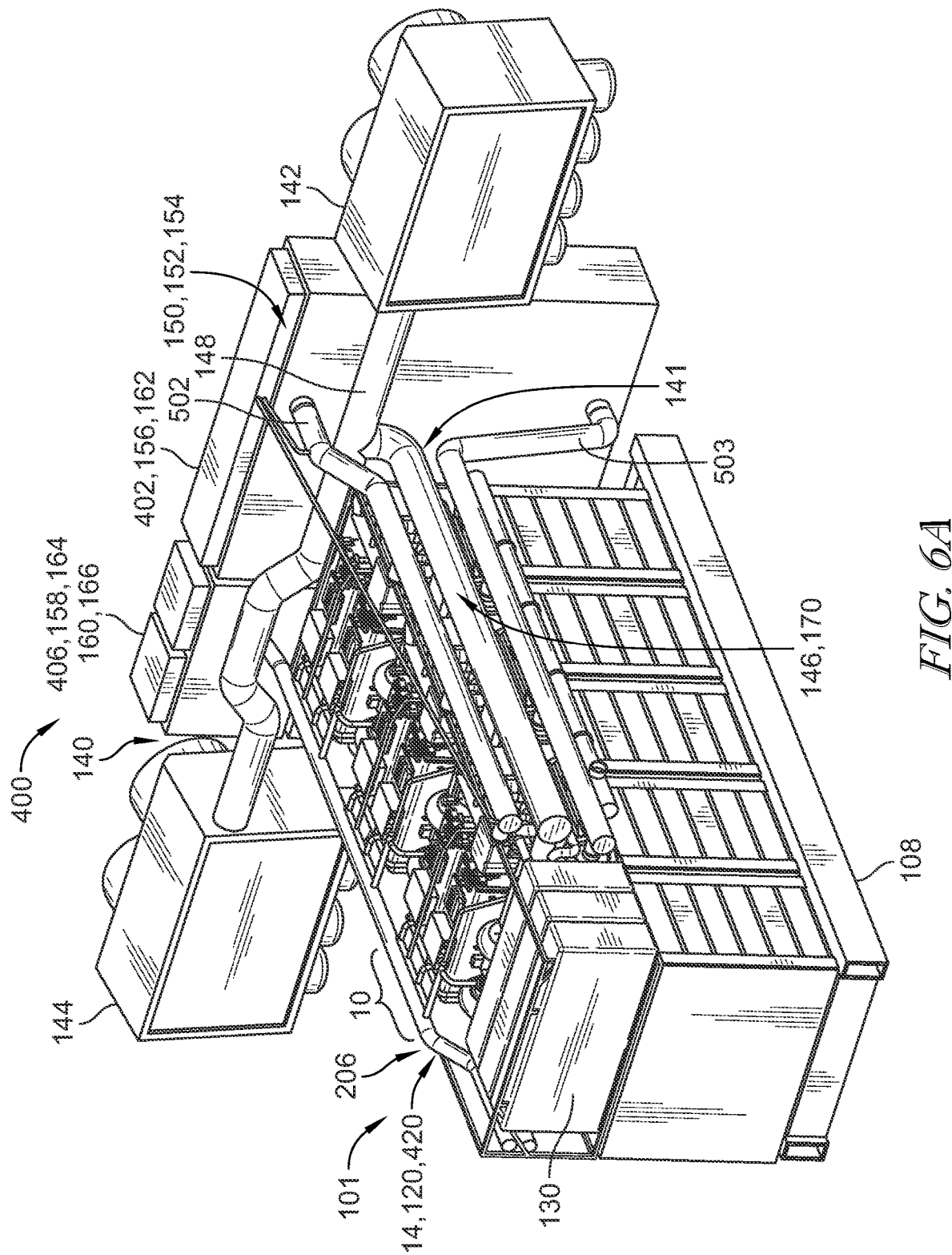
FIG. 6A is a front perspective view of the modular power system of FIGS. 2A and 2B connected to the modular radiator system of FIG. 5, along with an air handling and/or coolant piping system.
Figure 6B:
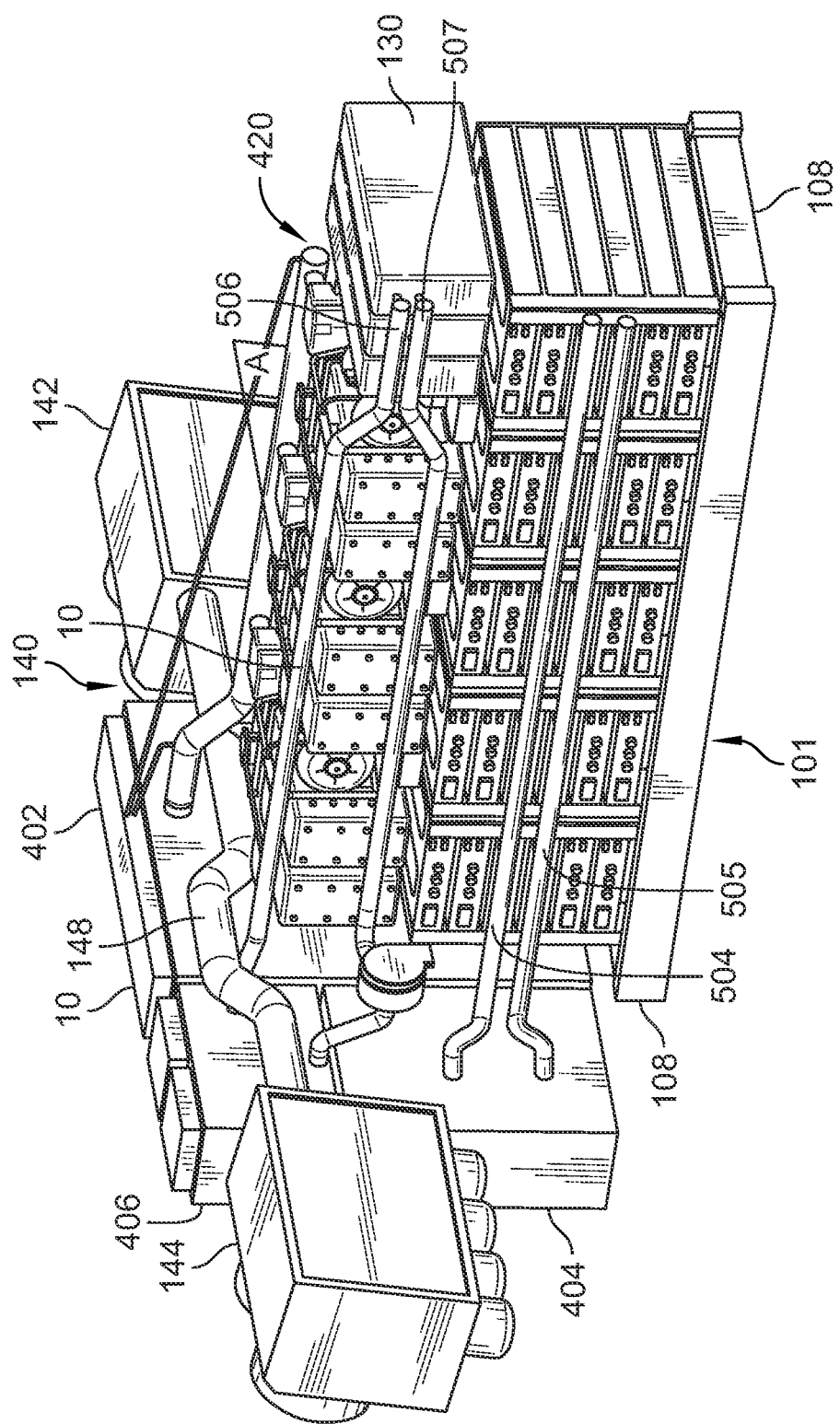
FIG. 6B is a back perspective view of the modular power system of FIG. 6A.

As shown in FIG. 6A, the first outlet pipe 502 and the first inlet pipe 503 may be located above the chassis 108 and on the same side of the modular power system 101. In some embodiments, the first outlet pipe 502 may be located at a greater distance away from and/or above the chassis 108 than the first inlet pipe 503. In other embodiments, the first outlet pipe 502 may be located at a lesser distance away from and/or above the chassis 108 than the first inlet pipe 503, such that the first inlet pipe 503 is located a greater distance away from and/or above the chassis 108.

The piping system 150 may be located adjacent to the modular fuel cell system 10, such that the first outlet pipe 502 and first inlet pipe 503 are located and/or oriented in a plane that is parallel to the chassis 108 of the vehicle 600 (i.e., perpendicular to plane A). However, it should be noted that in some instances, one or more pipes of the piping system 150 may be oriented in a vertical orientation such as in a plane that is perpendicular to the chassis 108 of the vehicle 600 (e.g., similar to the vertical plane of the fuel cell stacks 12 and the battery stacks 124).

FIG. 6B illustrates a second coolant pipe 162 that delivers a second coolant 158 from the second radiator 404 to the battery module 120 through a second outlet pipe 504. The second coolant pipe 162 may also return the second coolant 158 from the battery module 120 back to the second radiator 404 through a second inlet pipe 505. In some embodiments, the second outlet pipe 504 may be a single pipe delivering the second coolant 158 from the second radiator 404 to each battery 122 in the plurality of battery stacks 124 of the battery module 120. Alternatively, or additionally, the second inlet pipe 505 may be a single pipe returning the second coolant 158 from each battery stacks 124 to the second radiator 404.

As shown in FIG. 6B, the second outlet pipe 504 and second inlet pipe 505 may be located above the chassis 108 and on the same side of the modular power system 101. In some embodiments, the second outlet pipe 504 may be located a greater distance away from and/or above the chassis 108 than the second inlet pipe 505. In other embodiments, the second outlet pipe 504 may be located a lesser distance away from and/or above the chassis 108 than the second inlet pipe 505, such that the second inlet pipe 505 is located a greater distance away from and/or above the chassis 108.

Further, FIG. 6B illustrates a third coolant pipe 166 that may deliver a third coolant 160 from the third radiator 406 to the power electronic system 420 and/or the voltage converter module 130 through a third outlet pipe 506. The third coolant pipe 166 may also return the third coolant 160 from the voltage converter module 130 back to the third radiator 406 through a third inlet pipe 507. In some embodiments, the third outlet pipe 506 is a single pipe delivering the third coolant 160 from the third radiator 406 to each voltage converter 132 of the voltage converter module 130. Alternatively or additionally, the third inlet pipe 507 may be a single pipe returning the third coolant 160 from each voltage converter 132 to the third radiator 406.

As shown in FIG. 6B, the third outlet pipe 506 and the third inlet pipe 507 may be located above the chassis 108 and on the same side of the modular power system 101. In some embodiments, the third outlet pipe 506 may be located a greater distance away from and/or above the chassis 108 than the third inlet pipe 507. In other embodiments, the third outlet pipe 506 may be located a lesser distance away from and/or above the chassis 108 than the third inlet pipe 507, such that the third inlet pipe 507 is located a greater distance away from and/or above the chassis 108.

As stated above, having a single pipe for each coolant outlet and inlet that independently delivers and returns the coolants 152 from each fuel cell module 14, battery module 120, and/or voltage converter module 130, reduces the space needed for the piping system 150 and also reduces overall cost. Another advantage of the independent coolant pipes 154 is that the independent coolant pipes 154 prevent the coolant 152, 156, 158, 160 for each of the three radiators 402, 404, 406 from mixing with the coolant 152, 156, 158, 160 for another radiator 402, 404, 406. The present modular radiator system 400 also prevents the coolant 152, 156, 158, 160 from the first, second, and third radiators from contaminating the core fuel cell system 10 comprising the fuel cell stacks 12, 106 and their corresponding fuel cells 20, and thereby ensuring the state of health and optimal performance of the fuel cell module 14.

In one embodiment, the first outlet pipe 502 and the first inlet pipe 502 of the first coolant pipe 162 prevents the first coolant 156 of the first radiator 402 to mix with the coolants 158, 160 of the second radiator 402 and the third radiator 406. In one embodiment, the second outlet pipe 504 and the second inlet pipe 505 of the second coolant pipe 164 prevents the second coolant 158 of the second radiator 404 to mix with the coolants 156, 160 of the first radiator 402 and third radiator 406. In another embodiment, the third outlet pipe 506 and the third inlet pipe 507 of the third coolant pipe 166 prevents the third coolant 160 of the third radiator 406 to mix with the coolants 156, 158 of the first radiator 402 and second radiator 404.

FIGS. 6A and 6B illustrate an air pumping system 140 that delivers air as an oxidant (e.g., oxygen) to all of the fuel cells 20 of the plurality of the fuel cell stacks 106. The air pumping system 140 may include a first air filter 142 located on a first side of the modular power system 101 and the modular radiator system 400. The air pumping system 140 may include a second air filter 144 located on a second side of the modular power system 101 and the modular radiator system 400.

The first air filter 142 and the second air filter 144 deliver air to all of the fuel cells of the plurality of fuel cell stacks 106. Air delivery to the fuel cells occurs through a first air pipe 146 located on the first side of the modular power system 101 and the modular radiator system 400. A second air pipe 148 connects the first air filter 142 to the second air filter 144. Having fuel cell stacks 12 in pair arrangement (fuel cell stack pairs 202), i.e., fuel cell stacks mounted transversely side by side, enable the air pumping system 140 to accommodate a log manifold structural configuration 141 that feeds air to each fuel cell stack 12 of the fuel cell module 14 of the modular power system 101. Thus, the log manifold structural configuration 141 feeds air to all fuel cells 20 of the fuel cell stacks 12.

Accordingly, the log manifold structural configuration 141 of the present air pumping system 140 may include a tee connector ("tee") 170 on the first air pipe 146 at each fuel cell stack 12 location. The number of tees 170 may depend on the number of fuel cell stacks 12. Therefore, based on the number of fuel cell stacks 12 in the fuel cell module 14, the length of the first air pipe 146 may change and not the entire design of the manifold configuration. As stated above, having fuel cell stacks 12 in a pair arrangement (fuel cell stack pairs 202) have various advantages, as described herein.

Figures 9A, 9B:
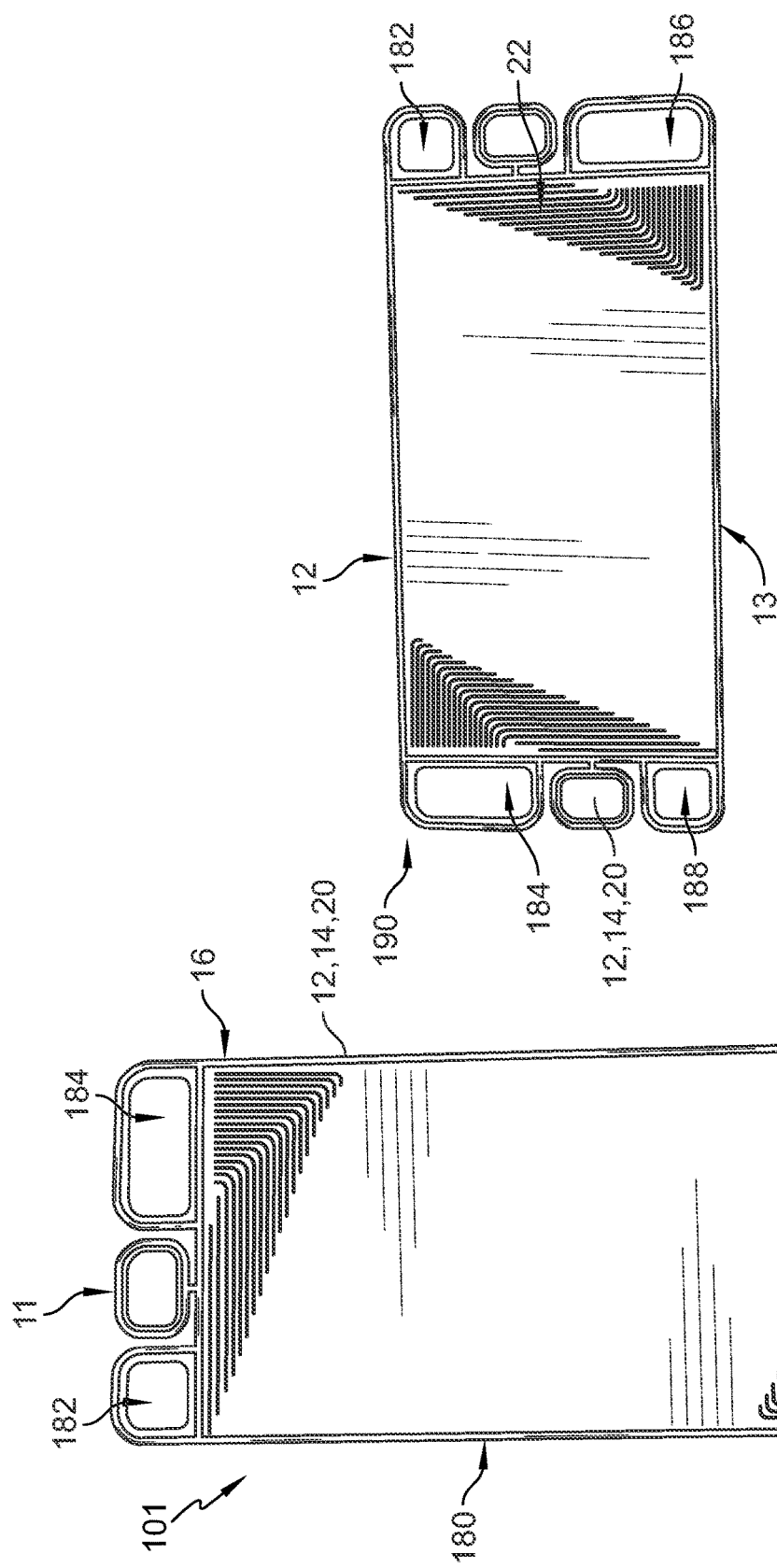
FIG. 9A is an illustration of a water management system that removes product water and unused gasses from a vertically oriented fuel cell.
FIG. 9B is an illustration of a water management system that removes product water and unused gasses from a horizontally oriented fuel cell.

FIGS. 9A and 9B illustrate water management systems 180, 190 of the modular power system 101. The water management systems 180, 190 remove product water and unused gasses from the fuel cell stacks 12 in the fuel cell module 14. Water may be removed when the fuel cell module 14 and/or fuel cell stacks 12 are vertically oriented 180 and/or horizontally oriented 190.

The water management systems 180, 190 may include a fuel inlet 182 and an air inlet 184 located on the top 11 of the fuel cell module 14 and/or fuel cell stacks 12. The water management systems 180, 190 may also include an air and water outlet 186 and a fuel and water outlet 188 located at the bottom 13 of the fuel cell module 14 and/or fuel cell stacks 12.

The air inlet 184 is located diagonally opposite the air and water outlet 186. The fuel inlet 182 is located diagonally opposite the fuel and water outlet 188. Since water flows downhill, the product water is removed from the bottom of the fuel cell module 14.

The vertical arrangement of the fuel cell module 14 shown in FIG. 9A only works well with a humidified stack 12 architecture platform where the gases in the fuel cell module 14 and stack 12 are not dry. In a non-humidified stack architecture plan, the membranes 22 of the fuel cells 20 at the top 11 of the fuel cell module 14 may dry out when the gases are dry. The drying of the membranes 22 may create a localized operational failure of the fuel cell stack 12 or module 14.

A horizontal/cross-flow design of the water management system 190 may be implemented in a non-humidified platform to obtain better water distribution across the surface of the membrane 22 of the fuel cells 20 to prevent such localized operational failures. The horizontal arrangement 190 of the fuel cell module 14 shown in FIG. 9B works with both a humidified stack 12 architecture platform and a non-humidified stack 12 architecture platform.

Accordingly, once the present modular power system 101 has been interchanged and/or exchanged with an engine power module to be located upon and/or within a vehicle (e.g., a mining haul truck), the modular power system 101 may be further connected to a balance of plant (BOP) system upon the vehicle to ensure proper performance and operation of the power system 101. Specifically, the modular power system 101 is configured to be connected to, attached to, and/or controlled with the modular radiator system 400, the coolant piping system 150, the air handling system 140, and/or the water management systems 180, 190 while located upon and/or within a vehicle 600.

Moreover, the present disclosure may advantageously allow current or conventional engine trucks to be time and cost efficiently transformed into hybrid vehicles 600 that are more environmentally and budget friendly. FIG. 7A illustrates a modular fuel supply system 700 providing fuel (e.g., hydrogen) to a vehicle 600 powered by a fuel cell system, including the modular fuel cell system 10 described herein. In one embodiment, the vehicle 600 is a hybrid vehicle. In another embodiment, the hybrid vehicle is a truck. In a further embodiment, the truck is a mining truck.

The present modular fuel supply system 700 includes a first hydrogen supply module 604 located on one side (e.g., a right side) of the vehicle 600. The modular fuel supply system 700 may be located between a front wheel 606 and a back wheel 608 of the vehicle 600. In addition, the modular fuel supply system 700 may include a second hydrogen supply module 604 located on a second side (e.g., a left side) of the vehicle 600. While side mounting of two or more modular fuel supply system 700 on the vehicle 600 provides easy access to hydrogen refill or fueling stations, the present modular fuel supply systems 700 may be located on any side (e.g., front or back) or within any space upon the vehicle 600 available and/or safe for fuel storage.

Figure 7B:
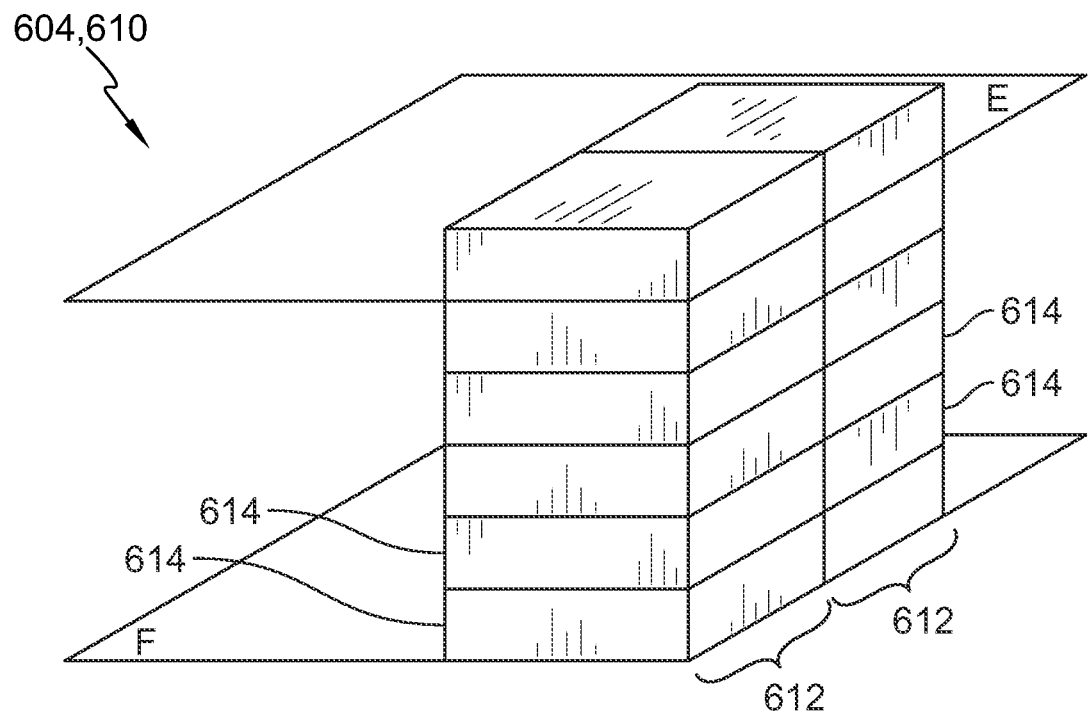
FIG. 7B is a perspective view of the modular fuel (e.g., hydrogen) supply system of FIG. 7A.

FIG. 7B shows a perspective view of the first hydrogen supply module 604. In one embodiment, the first hydrogen supply module 604 includes a single hydrogen supply stack 612 of hydrogen supply tanks 614 (see FIG. 7A). In another embodiment, the first hydrogen supply module 604 comprises two or more (e.g., a plurality) of hydrogen supply stacks 612 (see FIG. 7B).

Figure 7C:
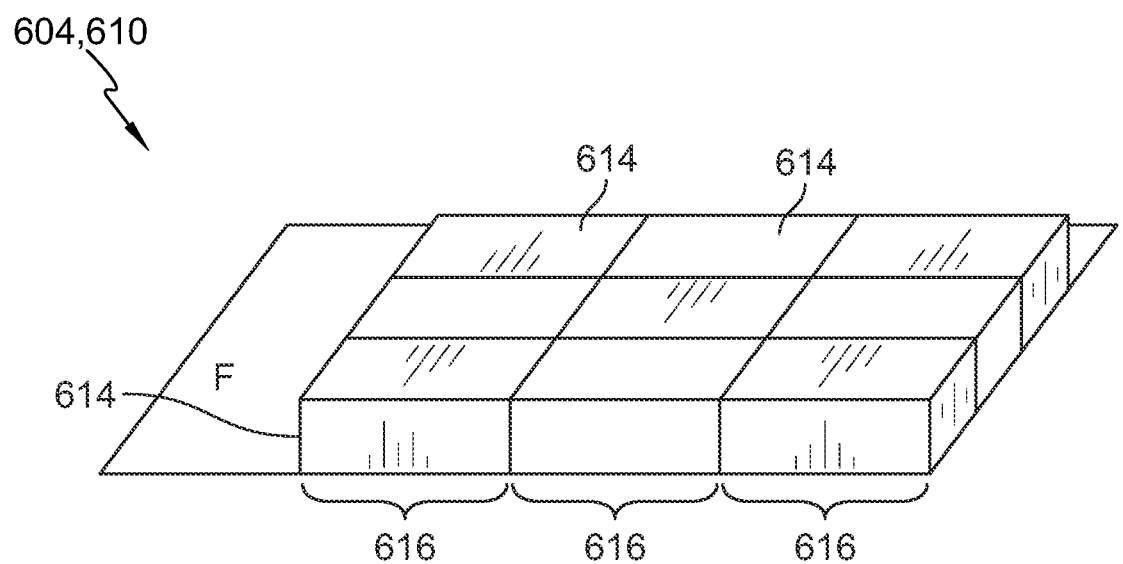
FIG. 7C is a perspective view of the modular fuel (e.g., hydrogen) supply system of FIG. 7A.

As shown in FIGS. 7A and 7C, each hydrogen supply stack 612 includes a plurality of hydrogen tanks 614. The hydrogen supply tanks 614 are arranged in planes parallel to the chassis 108 of the vehicle 600 (e.g., planes E and F). For example, planes E and F, as shown in FIG. 7B, are perpendicular to plane A (shown in FIG. 6B) and any additional plane parallel to plane A, which are vertical and/or perpendicular to the chassis 108.

FIG. 7C shows a perspective view of the first or second hydrogen supply module 604, 610 according to another embodiment. In this embodiment, the first hydrogen supply module 604 includes two or more (e.g., a plurality) hydrogen supply stacks 616. In another embodiment, a hydrogen supply module 604, 610 could comprise only a single hydrogen supply stack 616.

Each hydrogen supply stack 616 includes a plurality of hydrogen tanks 614. The hydrogen supply tanks 614 are arranged in a plane parallel to the chassis 108 of the vehicle 600 (e.g., plane F). Accordingly, the hydrogen tanks 614 are all arranged in a single plane parallel to the chassis 108 and adjacent to each other.

This arrangement of FIG. 7C may be used in vehicles that have small wheels or in general smaller vehicles. In some embodiments, the modular fuel supply system 700 includes a second hydrogen supply module 610 located on a different side of the vehicle 600 as to the first hydrogen supply module 604. The second hydrogen supply module 610 may be located opposite to a side that the first hydrogen supply module 604 is located. For example, the second hydrogen supply module 610 may be located on a right side between a front wheel 616 and a back wheel 618 of the vehicle 600, while the first hydrogen supply module 604 is located on the left side. Importantly, multiple hydrogen supply modules 604, 610 may be located and/or oriented on the same and/or multiple sides of the vehicle 600.

Hydrogen fuel can be of various forms, such as a gaseous hydrogen and a liquid hydrogen. In some circumstances, the hydrogen fuel is in a vaporized form, so as to enable its delivery to the fuel cell stacks 12. Further, the hydrogen fuel in a gaseous form can have various pressures.

Similar to the first hydrogen supply module 604, the second hydrogen supply module 610 includes a second plurality of hydrogen supply stacks 612 that include a second plurality of hydrogen tanks 614. Similar to the first hydrogen supply module, the hydrogen supply tanks 614 are arranged in one or more planes located parallel to the chassis 108 of the vehicle 600 (e.g., planes E and F). While any number of hydrogen tanks 614 may be comprised in the hydrogen supply modules 604, 610, in one embodiment, both the first and second hydrogen supply modules 604, 610 include about twelve hydrogen tanks 614.

Each hydrogen supply tank 614 is able to operate independently from other hydrogen supply tanks. This modular fuel supply configuration 604, 610 having individual hydrogen supply tanks 614 arranged in one or more stacks 612 has multiple advantages over simply having a single hydrogen supply tank. One advantage is that it takes shorter time to fill one smaller tank 614 than an entire single larger tank required to power a full fuel cell module 14. This configuration 604, 610 also provides easy access to replace or fill each hydrogen tank 614 as needed instead of replacing the whole unit 604, 610.

Depending on the vehicle 600 operation mode, one or more hydrogen supply tanks 614 can be turned on or off to operate the vehicle 600 rather than having the single tank 614 continuously on during operation of the vehicle 600. Accordingly, each hydrogen tank 614 is capable of being controlled and/or regulated to operate at its own pressure and/or temperature and thus have a different rate of flow that may lead to some tanks emptying and/or malfunctioning at different times or rates than other hydrogen supply tanks 614.

Figure 10:
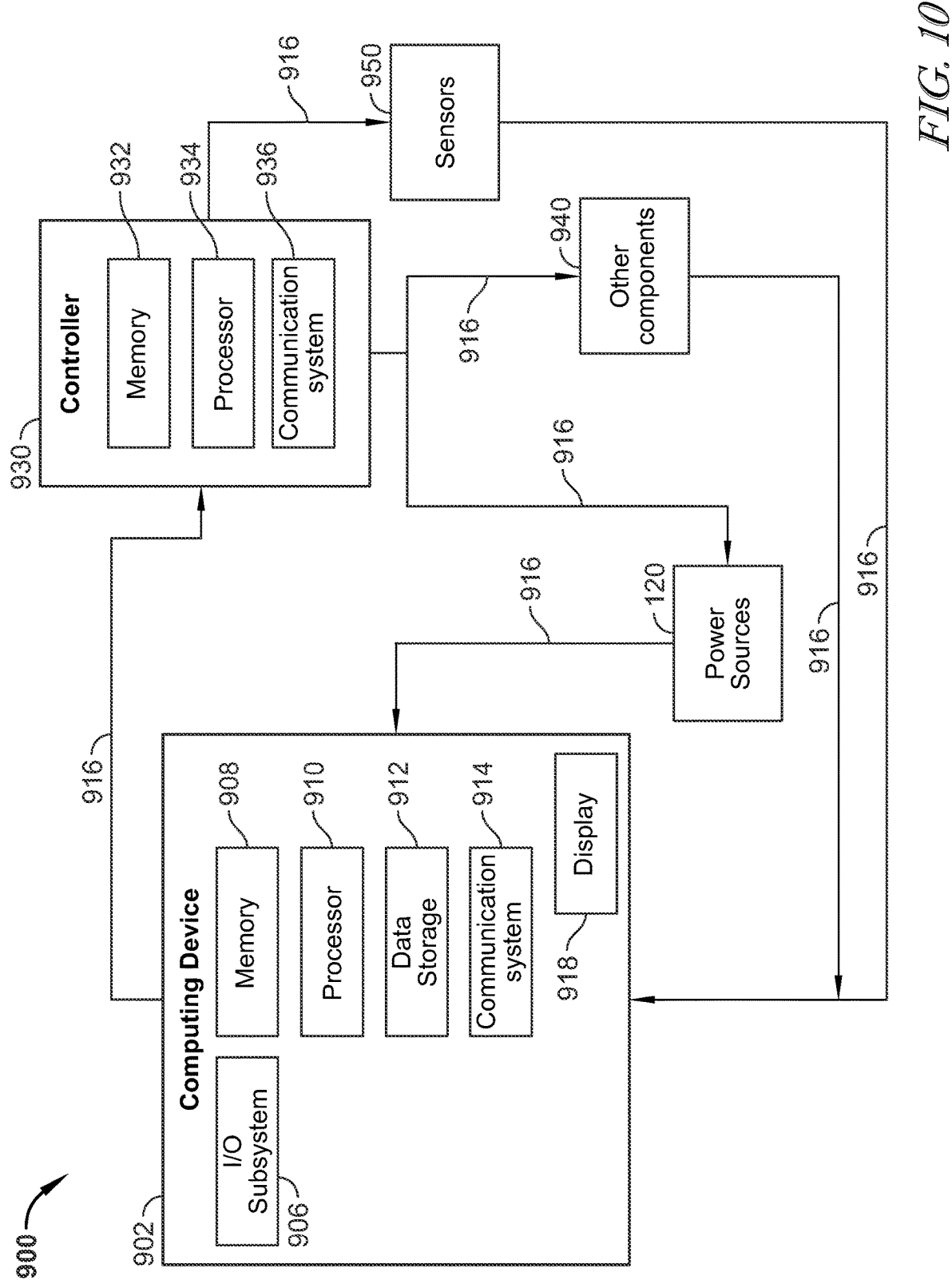
FIG. 10 is a block diagram of one embodiment of a control system to control the modular power system and/or the vehicle.

In some embodiments, a control system 900 or method shown in FIG. 10 may be utilized to control the modular power system 101 and/or the vehicle 600. Control and/or regulation of the modular fuel supply system 604, 610, the modular power system 101, the modular fuel cell system 10, the modular radiator system 400, the piping system 150, the air handling system 140, and/or water management systems 180, 190 may be performed manually (e.g., by a user or operator), electronically, remotely, automatically, in real-time, by machine learning, artificial intelligence, etc. Typically, any control system 900 to control or regulate the systems described herein include a controller 930, a processor 934, and optionally one or more different types of sensors 950 that are configured to be connected and/or attached to the present systems. Sensors 950 of any such control system 900 may include temperature, pressure, current, voltage, air flow rate, coolant flow rate, etc.

The control system 900 includes a computing device 902 in communication over a network 916 with other components of the control system 900 including but not limited to a controller 930, one or more power sources 920 in the vehicle 600, and other components 940 of the vehicle 600 that determine function and performance.

The computing device 902 may be embodied as any type of computation or computer device capable of performing the functions described herein, including, but not limited to, a server (e.g., stand-alone, rack-mounted, blade, etc.), a network appliance (e.g., physical or virtual), a high-performance computing device, a web appliance, a distributed computing system, a computer, a processor-based system, a multiprocessor system, a smartphone, a tablet computer, a laptop computer, a notebook computer, and a mobile computing device.

The illustrative computing device 902 of FIG. 10 may include one or more of an input/output (I/O) subsystem 906, a memory 908, a processor 910, a data storage device 912, a communication subsystem 914, and a display 918 that may be connected to each other, in communication with each other, and/or configured to be connected and/or in communication with each other through wired, wireless and/or power line connections and associated protocols (e.g., Ethernet, InfiniBand®, Bluetooth®, Wi-Fi®, WiMAX, 3G, 4G LTE, 5G, etc.).

The computing device 902 may also include additional and/or alternative components, such as those commonly found in a computer (e.g., various input/output devices). In other embodiments, one or more of the illustrative computing device 902 of components may be incorporated in, or otherwise form a portion of, another component. For example, the memory 908, or portions thereof, may be incorporated in the processor 910.

The processor 910 may be embodied as any type of computational processing tool or equipment capable of performing the functions described herein. For example, the processor 910 may be embodied as a single or multi-core processor(s), digital signal processor, microcontroller, or other processor or processing/controlling circuit. The memory 908 may be embodied as any type of volatile or non-volatile memory or data storage capable of performing the functions described herein.

In operation, the memory 908 may store various data and software used during operation of the computing device 902 such as operating systems, applications, programs, libraries, and drivers. The memory 908 is communicatively coupled to the processor 910 via the I/O subsystem 906, which may be embodied as circuitry and/or components to facilitate input/output operations with the processor 910, the memory 908, and other components of the computing device 902.

For example, the I/O subsystem 906 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations.

In one embodiment, the memory 908 may be directly coupled to the processor 910, for example via an integrated memory controller hub. Additionally, in some embodiments, the I/O subsystem 906 may form a portion of a system-on-a-chip (SoC) and be incorporated, along with the processor 910, the memory 908, and/or other components of the computing device 902, on a single integrated circuit chip (not shown).

The data storage device 912 may be embodied as any type of device or devices configured for short-term or long-term storage of data such as, for example, memory devices and circuits, memory cards, hard disk drives, solid-state drives, or other data storage devices. The computing device 902 also includes the communication subsystem 914, which may be embodied as any communication circuit, device, or collection thereof, capable of enabling communications between the computing device 902 and other remote devices over the computer network 916.

The components of the communication subsystem 914 may be configured to use any one or more communication technologies (e.g., wired, wireless and/or power line communications) and associated protocols (e.g., Ethernet, InfiniBand®, Bluetooth®, Wi-Fi®, WiMAX, 3G, 4G LTE, 5G, etc.) to effect such communication among and between system components and devices. The controller 930, the power sources 920, the computing device 902, and additional features or components 940 of the vehicle 600 may be connected, communicate with each other, and/or configured to be connected or in communication with each over the network 916 using one or more communication technologies (e.g., wired, wireless and/or power line communications) and associated protocols (e.g., Ethernet, InfiniBand®, Bluetooth®, Wi-Fi®, WiMAX, 3G, 4G LTE, 5G, etc.).

The computing device 902 may also include any number of additional input/output devices, interface devices, hardware accelerators, and/or other peripheral devices. The computing device 902 of the control system 900 of a vehicle 600 may be configured into separate subsystems for managing data and coordinating communications throughout the vehicle and/or powertrain.

The display 918 of the computing device 902 may be embodied as any type of display capable of displaying digital and/or electronic information, such as a liquid crystal display (LCD), a light emitting diode (LED), a plasma display, a cathode ray tube (CRT), or other type of display device. In some embodiments, the display 918 may be coupled to or otherwise include a touch screen or other input device.

In one embodiment, an emission criteria management strategy is generated by the processor 910 based on several inputs 904, and applied or implemented by a controller 930 to affect the functioning of the vehicle and/or powertrain. The inputs 904 are provided by an operator or publicly or privately available information. In one embodiment, an emission criteria management strategy is generated by the processor 910 based on several inputs 904, and applied or implemented by a controller 930 in real time or automatically to affect the functioning of the vehicle and/or powertrain. In one embodiment, the controller 930 is in the same computing device 902 as the processor 910. In other embodiments, the controller 930 may include a memory 932, a processor 934, and a communication system 936, as previously described.

Further, depending on the size of the vehicle 600 and the amount of its operational power demand, the hydrogen supply module 604, 610 can include various hydrogen tanks 614. The hydrogen supply modules 604, 610 and the tanks 614 comprised therein can vary to any size, shape, volume, and/or capacity able to functionally fit on the vehicle 600. The systems and methods described herein are advantageous to timely and cost-efficiently convert non-hybrid vehicles, such as mining haul trucks comprising diesel engines, to hybrid vehicles, comprising fuel cell and/or battery power sources.

The features illustrated or described in connection with one exemplary embodiment may be combined with any other feature or element of any other embodiment described herein. Such modifications and variations are intended to be included within the scope of the present disclosure. Further, a person skilled in the art will recognize that terms commonly known to those skilled in the art may be used interchangeably herein.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Specified numerical ranges of units, measurements, and/or values comprise, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms "first", "second", "third" and the like, as used herein do not denote any order or importance, but rather are used to distinguish one element from another. The term "or" is meant to be inclusive and mean either or all of the listed items. In addition, the terms "connected" and "coupled" are not restricted to physical or mechanical connections or couplings, and can include electrical connections or couplings, whether direct or indirect.

Moreover, unless explicitly stated to the contrary, embodiments "comprising", "including," or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps.

The phrase "consisting of" or "consists of" refers to a compound, composition, formulation, or method that excludes the presence of any additional elements, components, or method steps. The term "consisting of" also refers to a compound, composition, formulation, or method of the present disclosure that excludes the presence of any additional elements, components, or method steps.

The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be understood that the above description is intended to be illustrative, and not restrictive. For example, the above-described embodiments (and/or aspects thereof) may be used individually, together, or in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A modular power system providing power to a vehicle, comprising:
   a fuel cell module having a plurality of fuel cell stacks, each fuel cell stack comprising a plurality of fuel cells, wherein each of the plurality of fuel cells is arranged in a vertical orientation in one or more planes located above and perpendicular to a chassis of the vehicle; and
   a battery module having a plurality of batteries arranged in one or more battery stacks, wherein the battery module is electrically connected to the fuel cell module, and wherein the plurality of batteries is located in one or more planes directly above the chassis and below the fuel cell module and parallel to the chassis and the fuel cell module.

2. The system of claim 1, further comprising a voltage converter module located in a same plane as the fuel cell module above the chassis and the battery module, wherein the voltage converter module comprises one or more voltage converters.

3. The system of claim 2, wherein the voltage converter module is located adjacent to the fuel cell module.

4. The system of claim 1, wherein the vertical orientation of each of the fuel cells comprises a 90 degree rotation of the plurality of fuel cells from a standard orientation, wherein the standard orientation has the plurality of fuel cells arranged in one or more planes parallel to the chassis.

5. The system of claim 1, wherein the battery module is located forward of a plurality of back wheels of the vehicle.

6. The system of claim 1, wherein the one or more battery stacks are arranged in one or more planes vertical to the chassis.

7. The system of claim 1, wherein the plurality of fuel cell stacks is arranged upon one or more planes parallel to the chassis and in a group of two providing a plurality of fuel cell stack pairs in the fuel cell module, and wherein the fuel cell stacks included in each of the plurality of fuel cell stack pairs are arranged horizontally adjacent one another.

8. The system of claim 7, wherein the fuel cell stacks in each fuel cell stack pair are electrically connected in series.

9. The system of claim 7, wherein each of the plurality of fuel cell stack pairs is electrically connected in parallel.

10. A modular fuel cell system providing power to a vehicle, comprising:
    a fuel cell module having a plurality of fuel cell stacks, each fuel cell stack comprising a plurality of fuel cells, wherein the fuel cells are arranged in a vertical orientation in one or more planes located above and perpendicular to a chassis of the vehicle, and
    an air pumping system configured to deliver air to all of the fuel cells comprised in the plurality of the fuel cell stacks, the air pumping system including a first air filter located on a first side of the fuel cell module, a second air filter located on a second side of the fuel cell module opposite the first side thereof, and a first pipe located on the first side of the fuel cell module and fluidly coupled to both of the first and second air filters, the first pipe being configured to deliver the air to all of the fuel cells of the plurality of fuel cell stacks.

11. The system of claim 10, wherein the vertical orientation of the plurality of fuel cells comprises a 90 degree rotation of the plurality of fuel cells from a standard orientation, wherein the standard orientation has the plurality of fuel cells arranged in one or more planes parallel to the chassis.

12. The system of claim 10, wherein the plurality of fuel cell stacks is arranged upon one or more planes parallel to the chassis in a group of two providing a plurality of fuel cell pairs in the fuel cell module, and wherein the fuel cell stacks included in each of the plurality of fuel cell pairs are arranged horizontally adjacent one another.

13. The system of claim 12, wherein each fuel cell pair of the plurality of fuel cell pairs is capable of operating independently from other fuel cell pairs.

14. The system of claim 10, wherein the air pumping system further includes a second pipe extending between and interconnecting the first air filter and the second air filter, and wherein the first pipe is coupled to the second pipe between the first and second air filters.

15. The system of claim 14, wherein the first pipe extends substantially perpendicular to the second pipe.

* * * * *